US008935661B2

(12) United States Patent  (10) Patent No.: US 8,935,661 B2
Hudson, III et al.  (45) Date of Patent: *Jan. 13, 2015

(54) GENERATING A HARDWARE DESCRIPTION FOR A PROGRAMMABLE HARDWARE ELEMENT BASED ON A GRAPHICAL PROGRAM INCLUDING MULTIPLE MODELS OF COMPUTATION

(71) Applicant: National Instruments Corporation, Austin, TX (US)

(72) Inventors: Duncan G. Hudson, III, Austin, TX (US); Rishi H. Gosalia, Austin, TX (US)

(73) Assignee: National Instruments Corporation, Austin, TX (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/864,908

(22) Filed: Apr. 17, 2013

(65) Prior Publication Data

US 2013/0232466 A1 Sep. 5, 2013

Related U.S. Application Data

(63) Continuation of application No. 12/569,023, filed on Sep. 29, 2009, now Pat. No. 8,453,111, which is a continuation-in-part of application No. 12/403,570, filed on Mar. 13, 2009, now Pat. No. 8,146,053, which (Continued)

(51) Int. Cl.
*G06F 9/44* (2006.01)

(52) U.S. Cl.
CPC ... *G06F 8/20* (2013.01); *G06F 8/34* (2013.01)
USPC ............................. 717/109; 717/113; 715/763

(58) Field of Classification Search
None
See application file for complete search history.

(56) References Cited

U.S. PATENT DOCUMENTS

| 4,796,179 A | 1/1989 | Lehman et al. |
| 4,831,580 A | 5/1989 | Yamada |
| 4,860,204 A | 8/1989 | Gendron et al. |
| 4,901,221 A | 2/1990 | Kodosky et al. |

(Continued)

FOREIGN PATENT DOCUMENTS

EP  1077404  2/2001

OTHER PUBLICATIONS

Edwards, Stephen Anthony, "The Specification and Execution of Heterogeneous Synchronous Reactive Systems", Doctoral Dissertation, University of California, Berkeley, 1997, 170 pages.

(Continued)

*Primary Examiner* — Van Nguyen
(74) *Attorney, Agent, or Firm* — Meyertons Hood Kivlin Kowert & Goetzel, P.C.; Jeffrey C. Hood; Joel L. Stevens

(57) ABSTRACT

Generating a hardware description for a programmable hardware element based on a graphical program including multiple models of computation. A graphical program may be received which includes a first portion having a first computational model and a second portion having a second computational model. A hardware description may be generated based on the graphical program. The hardware description may describe a hardware implementation of the graphical program. The hardware description may be configured to configure a programmable hardware element to implement functionality of the graphical program.

19 Claims, 27 Drawing Sheets computer system

Related U.S. Application Data is a continuation of application No. 10/869,572, filed on Jun. 16, 2004, now Pat. No. 7,506,304.

(60) Provisional application No. 60/571,205, filed on May 14, 2004.

(56) References Cited

U.S. PATENT DOCUMENTS

| | | | |
|---|---|---|---|
| 5,210,837 | A | 5/1993 | Wiecek |
| 5,481,712 | A | 1/1996 | Silver et al. |
| 5,481,741 | A | 1/1996 | McKaskle et al. |
| 5,576,946 | A | 11/1996 | Bender et al. |
| 5,612,866 | A | 3/1997 | Savanyo et al. |
| 5,732,277 | A | 3/1998 | Kodosky et al. |
| 5,742,504 | A | 4/1998 | Meyer et al. |
| 5,862,372 | A | 1/1999 | Morris et al. |
| 5,911,070 | A | 6/1999 | Solton et al. |
| 5,940,296 | A | 8/1999 | Meyer |
| 5,966,532 | A | 10/1999 | McDonald et al. |
| 6,044,211 | A | 3/2000 | Jain |
| 6,053,951 | A | 4/2000 | McDonald et al. |
| 6,219,628 | B1 | 4/2001 | Kodosky et al. |
| 6,272,672 | B1 | 8/2001 | Conway |
| 6,366,300 | B1 | 4/2002 | Ohara |
| 6,437,805 | B1 | 8/2002 | Sojoodi et al. |
| 6,453,464 | B1 | 9/2002 | Sullivan et al. |
| 6,865,429 | B1 | 3/2005 | Schneider et al. |
| 6,880,130 | B2 | 4/2005 | Makowski et al. |
| 6,934,667 | B2 | 8/2005 | Kodosky et al. |
| 6,934,668 | B2 | 8/2005 | Kodosky et al. |
| 6,961,686 | B2 | 11/2005 | Kodosky et al. |
| 7,000,190 | B2 | 2/2006 | Kudukoli et al. |
| 7,043,693 | B2 | 5/2006 | Wenzel et al. |
| 7,076,740 | B2 | 7/2006 | Santori et al. |
| 7,120,876 | B2 | 10/2006 | Washington et al. |
| 7,159,183 | B1 | 1/2007 | Kudukoli et al. |
| 7,177,786 | B2 | 2/2007 | Kodosky et al. |
| 7,200,838 | B2 | 4/2007 | Kodosky et al. |
| 7,210,117 | B2 | 4/2007 | Kudukoli et al. |
| 7,316,009 | B2 | 1/2008 | Peck |
| 7,496,985 | B1 | 3/2009 | Morad |
| 7,506,304 | B2 * | 3/2009 | Morrow et al. ............... 717/109 |
| 7,594,226 | B2 | 9/2009 | Stelzer et al. |
| 8,050,882 | B2 | 11/2011 | Sierer et al. |
| 8,146,053 | B2 * | 3/2012 | Morrow et al. ............... 717/109 |
| 8,453,111 | B2 * | 5/2013 | Hudson et al. ............... 717/109 |
| 2001/0052110 | A1 | 12/2001 | Orbanes et al. |
| 2002/0129333 | A1 | 9/2002 | Chandhoke et al. |
| 2003/0046663 | A1 | 3/2003 | Rogers et al. |
| 2003/0071842 | A1 | 4/2003 | King et al. |
| 2003/0071845 | A1 | 4/2003 | King et al. |
| 2004/0034696 | A1 | 2/2004 | Joffrain et al. |
| 2004/0034847 | A1 | 2/2004 | Joffrain et al. |
| 2004/0107414 | A1 | 6/2004 | Bronicki et al. |
| 2004/0158812 | A1 | 8/2004 | Dye et al. |
| 2004/0230946 | A1 | 11/2004 | Makowski et al. |
| 2005/0028138 | A1 | 2/2005 | Case et al. |
| 2005/0091602 | A1 | 4/2005 | Ramamoorthy et al. |
| 2005/0177816 | A1 | 8/2005 | Kudukoli et al. |
| 2005/0251789 | A1 | 11/2005 | Peck et al. |
| 2005/0257194 | A1 | 11/2005 | Morrow et al. |
| 2005/0257195 | A1 | 11/2005 | Morrow et al. |
| 2006/0225034 | A1 | 10/2006 | Peck et al. |
| 2007/0203683 | A1 | 8/2007 | Kornerup et al. |
| 2010/0325611 | A1 | 12/2010 | Hudson, III et al. |

OTHER PUBLICATIONS

Pino et al., "Cosimulating Synchronous DSP Designs with Analog RF Circuits," Hewlett Packard, 1999, 15 pages.
Altium Limited, "Allium Nexar release heads 'LiveDesign-enabled' 2004 product line-up", Press Release, Feb. 17, 2004, 3 pages.
Axys Design Automation, Inc., "Product Description for MaxCore", 2002, 2 pages.
Axys Design Automation, Inc., "Product Description for MaxSim", 2002, 2 pages.
International search report and written opinion, application No. PCT/US2005/016630, mailed Feb. 21, 2006.
Chang et al., "Heterogeneous Simulation- Mixing Discrete-Event Models with Dataflow", Journal of VLSI Signal Processing, The Netherlands, 1997, pp. 127-144.
Buck et al., "Ptolemy: A Framework for Simulating and Prototyping Heterogeneous Systems", International Journal in Computer Simulation, vol. 4, No. 2, 1994, pp. 155-182.
Besnard et al., "Design of a multi-formalism application and distribution in a data-flow context: an example", 12th International Symposium on Languages for International Programming, Athens, Greece, Jun. 1999, pp. 8-30.
Andrade et al., "Software Synthesis from Dataflow Models for G and LabVIEW", IEEE Asilomar Conference on Signals, Systems, and Computers, Pacific Grove, California, Nov. 1998, pp. 1705-1709.
National Instruments, "The Measurement and Automation Catalog 2004," 3 pages.
The Mathworks, "STATEFLOW for State Diagram Modeling Users Guide", Version 4, 1997, 6 pages.
The Mathworks, "SIMULINK Model-Based and System-Based Design", Version 5, Jul. 2002, 598 pages.
SIMULINK, ""Simulink Release Notes"", Jun. 2, 2004, 78 pages.
Chandrachoodan et al., "An Efficient Timing Model for Hardware Implementation of Multirate Dataftow Graphs", IEEE, May 2001, pp. 1153-1156.
"Optilab: Image Processing and Analysis Software for the Apple Macintosh I Users Manual", GTFS Inc., 1990, 238 pages.
Rizzo, John, "Image Analyst and Enhance," MacUser, Jul. 1990, pp. 55-58.
Rosenthal et al., "Integrated Approach to Machine Vision Application Development," SPIE vol. 1386, Nov. 8, 1990, pp. 158-162.
Villiger et al., "Self-timed Ring for Globally-Asynchronous Locally-Synchronous Systems," Proceedings of the 9th International Symposium on Asynchronous Circuits and Systems, May 12-15, 2003, IEEE, pp. 1-10.
Automatix, "Vision for Process Feedback and Control," News Release, Applefritter.com, Jul. 2, 2000, pp. 1-4.
"Definition: GUI (graphical user interface)," Search WinDevelopment, retrieved from <http://searchwindevelopment.techtarget.com/definition/GUI> on May 14, 2007, last updated Oct. 2006, p. 1.
Mort et al., "Low Cost Image Analysis Workstation Which is Menu Driven and Extensible," SPIE, vol. 1232, Feb. 4, 1990, pp. 380-389.
"IPLab User's Guide," Signal Analytics Corporation,1991, pp. 1-268.
Gitlow, Stuart, "X-Ray Vision," MacGuide Magazine, vol. 2, Issue 4, Jun. 1989, pp. 89-94.
Ford, Ric, "Optimage Processes Scientific Images," 1994, 1 page.
"Signal Analytics Brings Powerful Scientific Image Processing to the Macintosh II," Signal Analytics Corporation, News Release, Feb. 1, 1990, pp. 1-2.
"IPLab: Serious Scientific Image Processing for the Macintosh II," 1992, pp. 1-4.
"IPLab Gives You Unparalleled Value," Signal Analytics Corporation, 1992, pp. 1-6.
"IPLab Brings Affordable Scientific Image Processing to the Macintosh II," Signal Analytics Corp., estimated 1990, pp. 1-2.
"A Seminar on Machine Vision & Image Analysis," Automatix, Inc., 1993, pp. 1-46.
"Measurement and Automation Catalogue 1999," National Instruments, pp. 518-520.
"Ultimage and IPLab Spectrum," MacUser, Jul. 1991, pp. 1-5.
Magnusson, "State diagram generation," Term paper in the graduate course Attribute Grammars, Lund University, Spring 1999, 21 pages.
Vasilache et al., "Translating OMT State Diagrams with Concurrency into SDL Diagrams", University of Tsukuba, Japan, Aug. 28-31, 2000, 7 pages.
"Graphical User Interface (GUI)", The Motive Web Design Glossary, www.motive.co.nz/glossary/gui.php, retrieved May 14, 2007, 2 pages.
"IMAQ Vision Builder Tutorial", National Instruments, Jan. 1999, pp. 1-73.

(56) References Cited

OTHER PUBLICATIONS

"Special Report: Imaging and the Macintosh/Robust Image Databases," Advanced Imaging, Apr. 1991, pp. 18-32.
Bhattacharyya et al., "Synthesis of Embedded Software from Synchronous Dataflow Specifications", Journal of VLSI Signal Processing, vol. 21, 1999, pp. 151-166.
Hunt, "IDF: A graphical dataflow programming language for image processing and computer vision," IEEE, 1990, retrieved from the IEEE database Jan. 7, 2003, pp. 351-360.
Keddy et al., "DEDIP: A User-friendly environment for digital image processing algorithm development", IEEE, 1991, retrieved from the IEEE database on Jan. 1, 2003, pp. 733-736.
Konstantinides et al., "The Khoros Software Development Environment for Image and Signal Processing," 1992, retrieved from http://www.hpl.hp.com/techreports/92/HPL-92-96.pdf on Jan. 7, 2003, pp. 1-14.
Sim et al., "Design and Implementation of the Visual Programming Environment for the Distributed Image Processing", IEEE, 1996, retrieved from IEEE database on Jan. 7, 2003, pp. 149-152.
"SILMA Products—Production PILOT", retrieved from Internet on May 24, 2001, www.adept.com/Silma/products/pd-productionpilot.html, 4 pages.
"RoboWorks", Newtonium, retrieved from Internet on Mar. 30, 2002, www.newtonium.com/public_html/Products/RoboWorks/RoboWorks.htm, 3 pages.
"The Measurement and Automation Catalog 2002", National Instruments, pp. 1-19.
"Motion Architect User Guide," Compumotor, Aug. 1994, pp. 1-24.
"GE Fanuc Automation—Software Solutions," GE Fanuc, 2002, pp. 1-8.
"CIMPLICITY Machine Edition—Motion Developer", GE Industrial Systems, Dec. 6, 2001, pp. 1-4.
"GE Fanuc Automation—CIMPLICITY Machine Edition", GE Fanuc, 2000, pp. 1-4.
"Motion Builder: Making Motion Control Programming Easy", Servo Catalogue, Parker Automation, 1996, pp. 86-87.
"Signal Processing Work System, Hardware Design System User's Guide"; May 1996; 10 pages; Alta Group of Cadence Design Systems, Inc.
"Signal Processing Work System, Designer/BDE User's Guide"; Feb. 1996; 2 pages; Alta Group of Cadence Design Systems, Inc.
"Signal Processing Work System, HDS Library Reference"; May 1996; 6 pages; Alta Group of Cadence Design Systems, Inc.

* cited by examiner

```
signal s14D1 : std_logic; -- node 14D0 enable_out component prim_Add_16
    port (
        clk : in std_logic;
        enable_in, clr_enable_out : in std_logic;
        x_y : out std_logic_vector(15 downto 0);
        y : in std_logic_vector(15 downto 0);
        x : in std_logic_vector(15 downto 0);
        enable_out : out std_logic
    );
end component;

signal s1A01 : std_logic; -- node 1A00 enable_out
component prim_Multiply_16
    port (
        clk : in std_logic;
        enable_in, clr_enable_out : in std_logic;
        x_y : out std_logic_vector(15 downto 0);
        y : in std_logic_vector(15 downto 0);
        x : in std_logic_vector(15 downto 0);
        enable_out : out std_logic
    );
end component;
```

FIG. 21

GENERATING A HARDWARE DESCRIPTION FOR A PROGRAMMABLE HARDWARE ELEMENT BASED ON A GRAPHICAL PROGRAM INCLUDING MULTIPLE MODELS OF COMPUTATION

PRIORITY INFORMATION

This application is a continuation of U.S. utility application Ser. No. 12/569,023 titled "Generating a Hardware Description for a Programmable Hardware Element Based on a Graphical Program Including Multiple Models of Computation," filed Sep. 29, 2009, whose inventors are Duncan G. Hudson III and Rishi H. Gosalia, now issued as U.S. Pat. No. 8,453,111, which is a continuation-in-part of U.S. utility application Ser. No. 12/403,570 titled "Graphical Data Flow Programming Environment with First Model of Computation that Includes a Structure Supporting Second Model of Computation," filed Mar. 13, 2009, whose inventors are Gregory O. Morrow, John C. Limroth, Jeffrey L. Kodosky, Steven W. Rogers, Kevin Hogan, and Hugo A. Andrade, now issued as U.S. Pat. No. 8,146,853, which is a continuation of U.S. Pat. No. 7,506,304, titled "Graphical Data Flow Programming Environment with First Model of Computation that Includes a Structure Supporting Second Model of Computation," filed Jun. 16, 2004, whose inventors are Gregory O. Morrow, John C. Limroth, Jeffrey L. Kodosky, Steven W. Rogers, Kevin Hogan, and Hugo A. Andrade, which claims benefit of priority of U.S. provisional application Ser. No. 60/571,205 titled "Graphical Data Flow Programming Environment with First Model of Computation that Includes a Structure Supporting Second Model of Computation," filed May 14, 2004, whose inventors are Gregory O. Morrow, John C. Limroth, Jeffrey L. Kodosky, Steven W. Rogers, Kevin Hogan, Hugo A. Andrade, all of which are incorporated by reference in their entirety as if fully and completely set forth herein.

FIELD OF THE INVENTION

The present invention relates to the field of graphical programming, and more particularly to a system and method for generating a hardware description for a programmable hardware element based on a graphical program having multiple models of computation.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others. Some graphical programs have allowed for the use of multiple models of computation in a graphical program to perform these tasks.

However, it would be desirable to provide the user with the ability to develop user level software which operates at the hardware level. More particularly, it would be desirable to provide the user with the ability to develop high level software, such as graphical programs, which can then be readily converted into hardware level instrument functionality. This would provide the user with the dual benefits of being able to program instrument functionality at the highest level possible (text-based or graphical programs), while also providing the ability to have the created program operate directly in hardware for increased speed and efficiency.

SUMMARY OF THE INVENTION

Various embodiments are presented of a system and method for generating a hardware description for a programmable hardware element based on a graphical program having multiple models of computation. The following descriptions may be implemented as one or more computer programs executed by a processor, e.g., where program instructions are stored on a memory medium or as a computer system or device, as desired.

The graphical program may be received and/or generated, as desired. The graphical program may include a first portion having a first computational model and a second portion having a second computational model. The first portion of the graphical program may include a first plurality of interconnected nodes that visually indicates functionality of the first portion of the graphical program. The second portion of the graphical program may include a second plurality of interconnected nodes that visually indicates functionality of the second portion of the graphical program.

The first computational model and/or the second computational model may include data flow, state flow, time-based simulation flow, synchronous data flow, execution flow, control flow, and/or physical simulation.

In some embodiments, graphical program may be displayed on a display. The first portion and the second portion of the graphical program may be included in a same graphical interface on the display. In some embodiments, the second portion of the graphical program may be included in a first graphical structure of the graphical program.

A hardware description may then be generated based on the graphical program. The hardware description may describe a hardware implementation of the graphical program. The hardware description may be configured to configure a programmable hardware element to implement functionality of the graphical program.

The hardware description may include a first portion corresponding to the first portion of the graphical program and may include a second portion corresponding to the second portion of the graphical program. Accordingly, the hardware description may specify communication between the first portion and the second portion.

The programmable hardware element may be configured using the hardware description. Accordingly, during operation or execution, the programmable hardware element performs the functionality of the graphical program. In some embodiments, the programmable hardware element may be included in a real time target.

BRIEF DESCRIPTION OF THE DRAWINGS

A better understanding of the present invention can be obtained when the following detailed description of the preferred embodiment is considered in conjunction with the following drawings, in which:

FIG. 21 is an exemplary screen shot corresponding to the method of FIG. 19, where currently executing textual code is indicated on a display, according to one embodiment.

Figure 1A:
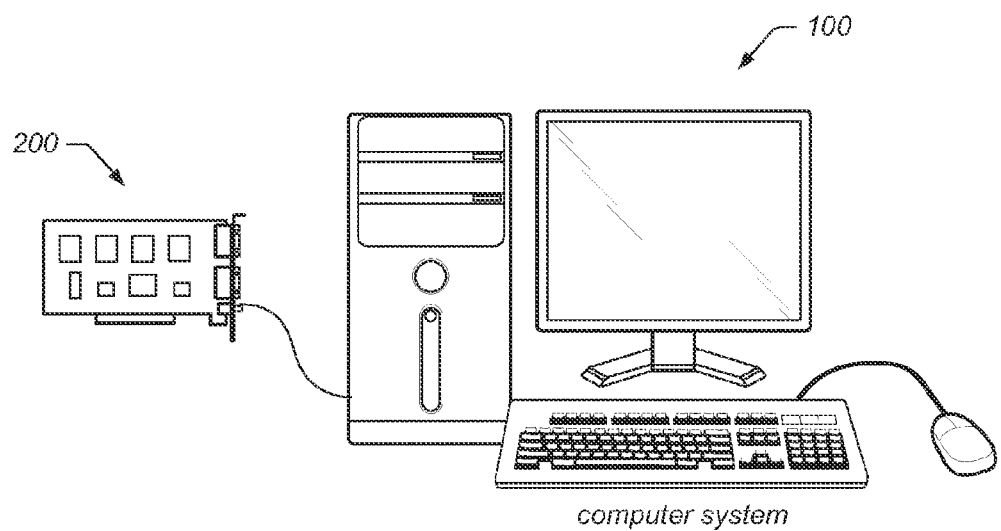
FIGS. 1A and 1B illustrates a computer system coupled to a target device, according to an embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000, now issued as U.S. Pat. No. 7,210,117.

U.S. patent application Ser. No. 11/539,449 titled "Automatic Conversion of Text-Based Code Having Function Overloading and Dynamic Types into a Graphical Program for Compiled Execution," filed Oct. 6, 2006, now issued as U.S. Pat. No. 7,954,059.

U.S. Patent Application Publication 2008/0034310, titled "Diagram That Visually Indicates Targeted Execution", filed on Aug. 11, 2007, now issued as U.S. Pat. No. 7,844,908.

U.S. patent application Ser. No. 10/113,987, titled "A Configuration Diagram Which Displays a Configuration of a System", filed on Apr. 1, 2002, now issued as U.S. Pat. No. 7,984,223.

U.S. Pat. No. 7,506,304, titled "Graphical Data Flow Programming Environment with First Model of Computation that Includes a Structure Supporting Second Model of Computation", filed on Jun. 16, 2004.

U.S. Patent Application Publication 2008/0270920, titled "Automatically Generating a Graphical Program with a Plurality of Models of Computation", filed on Apr. 24, 2007, now issued as U.S. Pat. No. 8,271,943.

U.S. patent application Ser. No. 11/609,928, titled "Coupling a Virtual Instrument to a Circuit Diagram", filed Dec. 13, 2006, now abandoned.

U.S. Patent Application Publication 2008/0109779, titled "System Simulation and Graphical Data Flow Programming in a Common Environment", filed Oct. 18, 2006, now issued as U.S. Pat. No. 7,568,178.

U.S. Pat. No. 7,302,675, titled "System and Method for Analyzing a Graphical Program Using Debugging Graphical Programs", filed Apr. 10, 2002.

U.S. Pat. No. 7,024,660, titled "Debugging A Program Intended to Execute on a Reconfigurable Device Using a Test Feed-Through Configuration", filed Oct. 29, 2001.

U.S. Pat. No. 6,064,409, titled "System and Method for Providing AutoProbe and Debugging Features in a Graphical Data Flow Program", filed Feb. 14, 1997.

U.S. Pat. No. 6,715,139, titled "System and Method for Providing and Displaying Debugging Information of a Graphical Program on a First Computer During Execution of the Graphical Program on a Second Computer", filed Aug. 3, 2000.

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A graphical program or diagram comprising a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Dynamically Typed—a program (or program portion) having variables, wherein types of the variables in the program were not specified by the user at edit time. Thus types of the variables in the program are not necessarily known prior to compile time (or possibly run time).

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Model of Computation (or Computational Model)—a model for visually specifying or visually representing program code to a user. A "model of computation" may also be considered as a set of program semantics of a programming language. Examples of "models of computation" include various forms of graphical data flow, such as data driven data flow (e.g., LabVIEW), demand driven data flow, and statically-scheduled data flow (including, but not limited to, synchronous data flow, heterochronous data flow, cyclo-static data flow, parameterized synchronous data flow, and discrete time data flow); synchronous reactive; process network; state diagram; control flow diagram; simulation diagram models (continuous time simulation data flow); various forms of text-based code (such as Matlab and MathScript, C, C++, etc.); and/or physical simulation (including physical domains such as circuits, hydrodynamics, mechanics, device modeling, thermodynamics, etc.), among others. "Statically-scheduled data flow" is data flow in which the firing pattern (i.e. execution order) of nodes is data-independent and can, therefore, be determined before run-time, e.g. at compile time. A "process network" is a set of deterministic sequential processes communicating through FIFO channels. "Synchronous reactive" can refer to a program where operations are given a certain amount of time to react, and if this constraint holds, the rest of the system appears synchronous.

A program portion may be visually represented on a display in a first computational model, but may in fact be actually implemented in the computer using a different computational model that may be hidden from the user. For example, Matlab is a text-based scripting language that is implanted in the C programming language. As another example, MathScript is a text-based scripting language implemented in the LabVIEW graphical programming language. A program portion may be represented in a first model of computation to provide a more intuitive visual representation of the functionality of the program portion, e.g., to allow the user to more readily understand and/or edit the program portion.

Figure 1B:
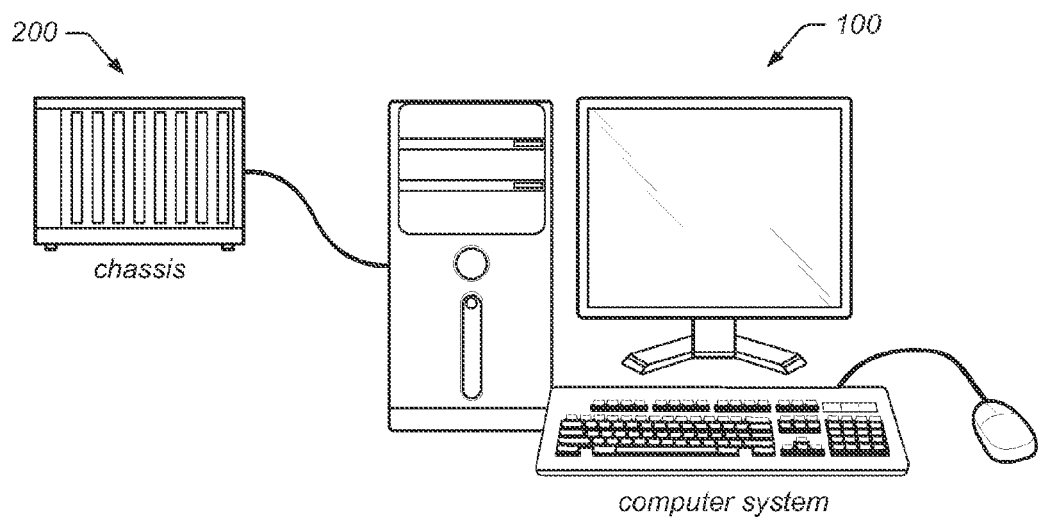

FIGS. 1A and 1B—Exemplary System Including a Target Device

FIGS. 1A and 1B illustrate embodiments of a system including a target device (e.g., a real time target device or embedded device) which may execute programs. As shown in FIG. 1A, the system may include a computer system 100 coupled, e.g., through a network, bus, or other transmission medium to the target device 200. In other embodiments, the computer system 100 may be coupled to the target device 200 via an intermediate hub, which may communicate with the computer system 100 over a network, and which may communicate with the target device 200 via wired or wireless means.

The computer system 100 may be any of various types of computer systems. Computer system 100 may include a processor, a memory medium, as well as other components as may typically be found in a computer system. The memory medium of the computer system may store a program development environment for creating programs. As used herein, the term program is intended to include text-based or graphical instructions which are executable, compilable, and/or interpretable by a processor or programmable hardware element (such as a Field Programmable Gate Array (FPGA)) to perform a specified function or functions.

In one embodiment, the program development environment may be a textual program development environment or may be a graphical program development environment for creating graphical programs which include textual code, e.g., in a textual code node. An exemplary graphical program development environment is the LabVIEW™ development environment offered by National Instruments Corporation. Other exemplary graphical program development environments are the SIMULINK™ and SIMSCAPE development environments offered by The MATHWORKS™. A user may create a program on a computer system, and computer system 100 may provide the program to target device 200, optionally via a hub device.

Target device 200 may include a processor and memory medium for executing programs. In one embodiment, the target device 200 executes programs received from the computer system over a network. In another embodiment, the computer system 100 sends the program to a hub device over a network, and the hub device operates to deploy the programs to the target device 200, e.g., in a wireless fashion, and the program executes on target device 200 in real time. It should be noted that in various embodiments, the target device 200 may be implemented as a card in a computer system (e.g., as shown in FIG. 1A) or in different devices, such as, for example, a device with an ARM processor, as described below, a PXI chassis which includes an embedded device card (as shown in FIG. 1B), or any other processor based device suitable for embedded systems. One exemplary target device 200 is a smart sensor (e.g., a smart camera).

In one embodiment, the target device 200 may include a programmable hardware element, such as an FPGA. The target device 200 may be operable to receive a hardware configuration file, e.g., a netlist, which encodes a desired functionality, and to deploy the hardware configuration file to the FPGA, thereby configuring the FPGA to perform the desired functionality.

Target device 200 may be connected to computer system 100 by a network. The network may be comprised of any of the various types of networks including local area networks (LAN), wide area networks (WAN), etc. One example of a wide area network is the Internet. Target device 200 may also connect to computer system 100 through other communication mediums, such as a serial bus, e.g., USB or IEEE 1394, a parallel bus, PCI, PCI Express, or through wireless means. The wireless communication mechanism may comprise any of various types of wireless transmission, including Blue Tooth, IEEE 802.11 (wireless Ethernet), RF communication, and other types of wireless communications, such as, for example, communication via satellite, and cell towers, such as used for cellular telephone communication, among others. In various embodiments, the target device 200 may include or may be coupled to one or more sensors or actuators. For example, the target device 200 may include a radio and may be coupled to a sensor via wireless means. In one embodiment, one or more of the sensors coupled to the target device 200 may be smart sensors, i.e., may include a processor and memory (and/or a programmable hardware element, such as an FPGA), and therefore may be operable to execute program code and/or receive commands from the target device 200 as a result of execution of the program code.

Embedded Devices

As mentioned above, in various embodiments of the present invention, the target device 200 may be a real time or embedded device which is coupled to the host computer 200. As used herein, the term "real time device" has its ordinary accepted meaning, and refers to a (typically small) platform which includes dedicated hardware and/or software (such as a real time operating system or programmable hardware element) that is designed to provide real time or deterministic performance. A "real time device" generally includes a processor and memory, or a programmable hardware element, on which may be installed dedicated programs or software. The real time device may be designed to ensure deterministic behavior, and may be configured to execute such programs or software in real time. For example, a graphical program may be implemented on a programmable hardware element of a real time device to ensure real time execution of the graphical program.

A real time device is typically designed to perform a defined task very well, and generally does not include display capabilities or user interface software. In particular, a real time device is typically not a device with general purpose capabilities, such as a PC or PXI controller, for example, loaded with one or several plug-in boards, running a Microsoft OS with generous amounts of memory, system files, utilities, etc, that can be used as a measurement system, or as an office computer, or as a Web browser, etc. An example of a real time device is an Internet remote camera, with dedicated hardware and software that implements the following tasks:

it acquires images from the optical device, it compresses these images as GIF or JPEG files, or perhaps as MPEG streams, and it sends the images to a host computer upon request, using TCP/IP, HTTP, or multimedia streams.

Other examples of real time devices include a measurement device with a specific type of measurement hardware and/or software for taking certain measurements, a control measurement device with a specific type of hardware and/or software for performing certain control operations, etc.

The end user does not care about how these tasks are implemented, but only wants a device that operates in real time, e.g., in a deterministic manner. Real time systems are often used as building blocks for more complicated applications. Thus, a real time device generally includes both hardware and software. Additionally, real time devices are generally built around a specialized hardware component, which is the "reason to exist" for these devices (like the camera in the above example). Typical components in a real time device include: a programmable hardware element, a processor, such as an ARM processor, RAM and ROM memory, a storage medium, a display, one or more communication devices, and power and over-voltage protection components. Generally, flash memory is used for data storage in addition to RAM.

Figure 2A:
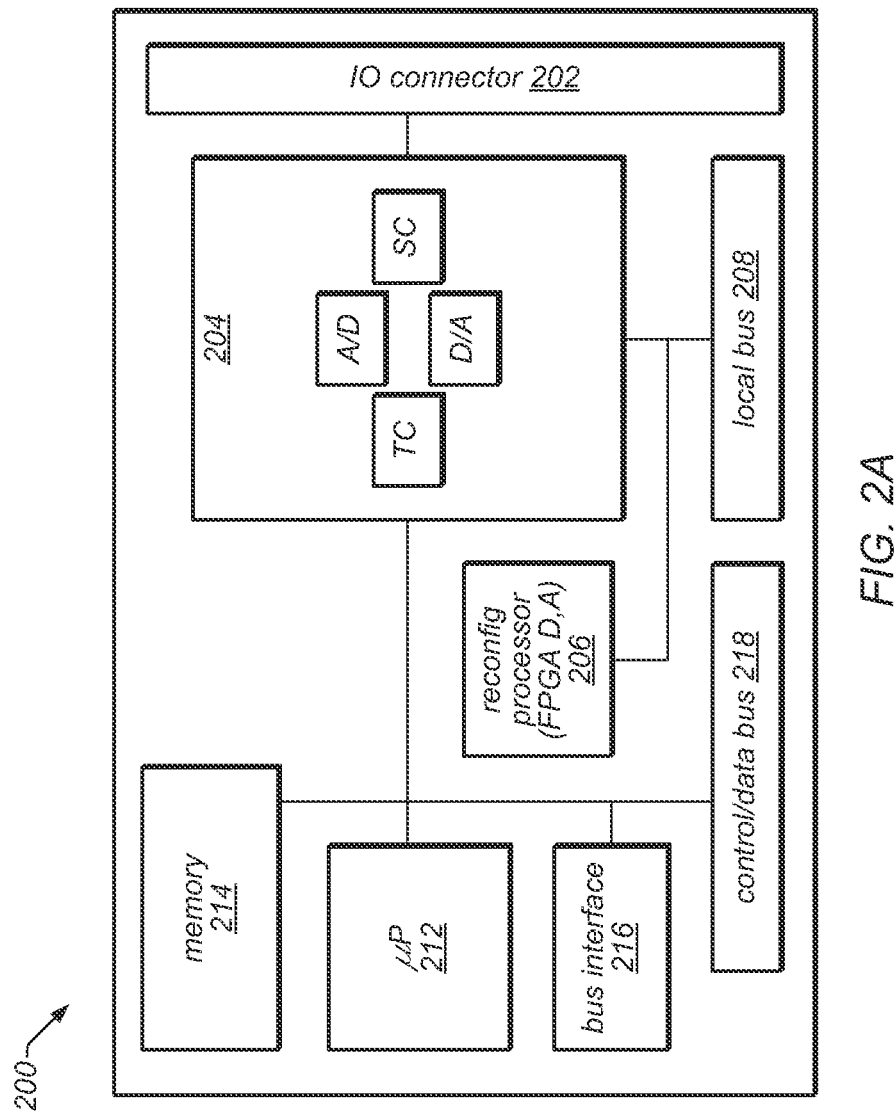
FIG. 2A illustrates an exemplary embodiment of a target device as an interface card configured with programmable hardware.
Figure 2B:
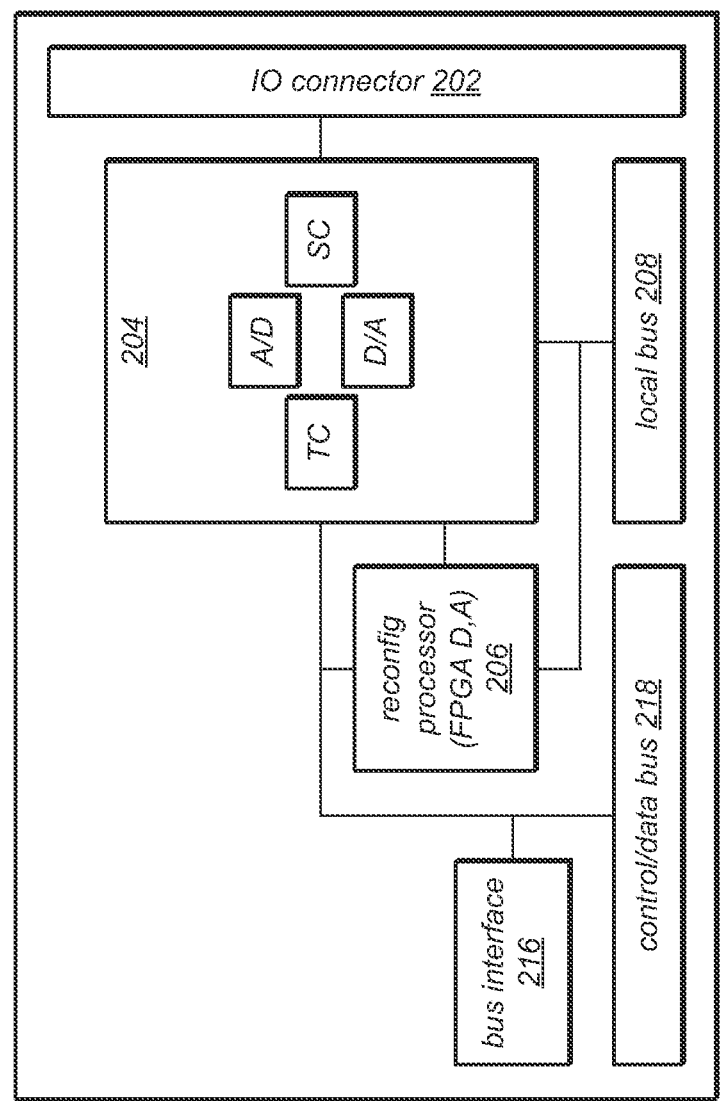
FIG. 2B illustrates an exemplary embodiment of a target device as an interface card that does not include a CPU and memory.
Figure 2C:
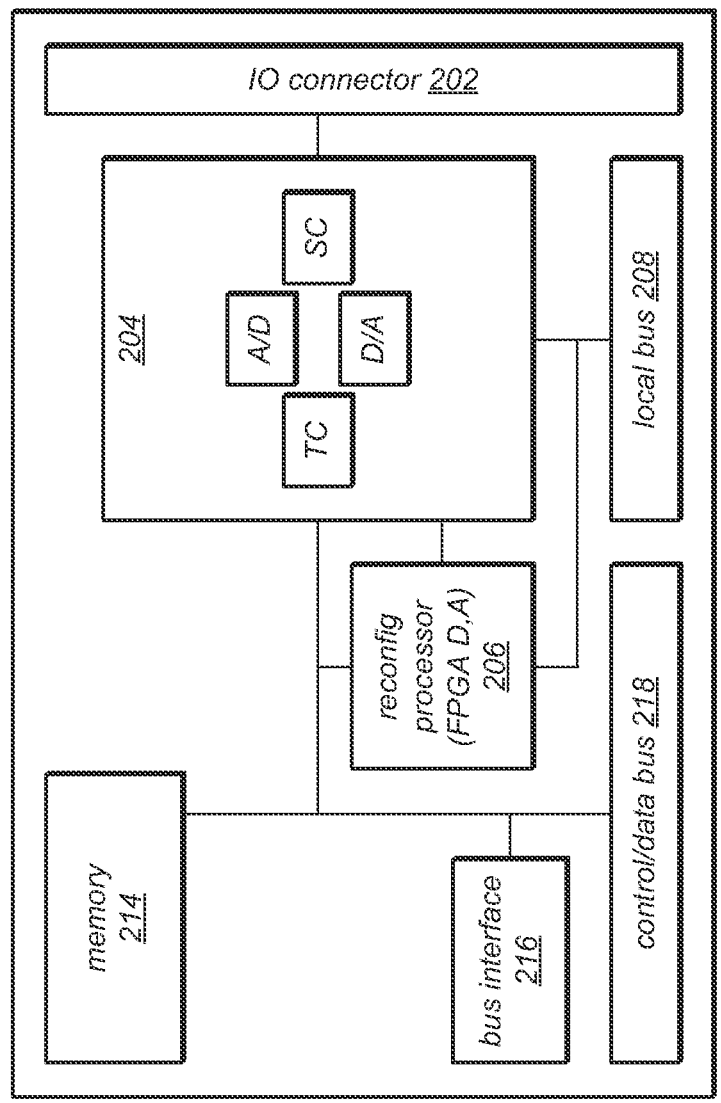
FIG. 2C illustrates an exemplary embodiment of a target device as an interface card that does not include a CPU.

FIGS. 2A-2C—Programmable Hardware Diagram

FIGS. 2A-2C are exemplary embodiments of target device 200.

FIG. 2A is a block diagram illustrating an embodiment of the target device 200 as an interface card configured with programmable hardware. It is noted that FIG. 2A is exemplary only, and an interface card or device configured with programmable hardware according to the present invention may have various architectures or forms, as desired. The interface card illustrated in FIG. 2A may be the target device shown in either of FIG. 1A or 1B. However, as noted above, the programmable hardware may be included on any of the various devices shown in later Figures, e.g., FIGS. 3A-3C, or on other devices, as desired.

As shown, the interface card 200 includes an I/O connector 202 which is coupled for receiving signals. In various embodiments, the I/O connector 202 presents analog and/or digital connections for receiving/providing analog or digital signals. The I/O connector 202 is adapted for coupling to SCXI conditioning logic, or is adapted to be coupled directly to a unit under test or process, as desired.

The interface card 200 also includes data acquisition (DAQ) logic 204. As shown, the data acquisition logic 204 comprises analog to digital (A/D) converters, digital to analog (D/A) converters, timer counters (TC) and signal conditioning (SC) logic as shown. The DAQ logic 204 provides the data acquisition functionality of the DAQ card 114.

In embodiments described here, the interface card 200 may include a programmable hardware element 206. The programmable hardware 206 may comprise a field programmable gate array (FPGA) such as those available from Xilinx, Altera, etc. The programmable hardware element 206 may be coupled to the DAQ logic 204 and is also coupled to the local bus interface 208. Thus, a graphical program can be created on the computer system 100, or on another computer in a networked system, and at least a portion of the graphical program can be converted into a hardware implementation form for execution in the FPGA 206. The portion of the graphical program converted into a hardware implementation form may be a portion which requires fast and/or real-time execution.

In the embodiment of FIG. 2A, the interface card 200 further includes a dedicated on-board microprocessor 212 and memory 214. This enables a portion of the graphical program to be compiled into machine language for storage in the memory 214 and execution by the microprocessor 212. This is in addition to a portion of the graphical program being converted into a hardware implementation form in the FPGA 206. Thus, in one embodiment, after a graphical program has been created, a portion of the graphical program is compiled for execution on the embedded CPU 212 and executes locally on the interface card 200 via the CPU 212 and memory 214, and a second portion of the graphical program is translated or converted into a hardware executable format and downloaded to the FPGA 206 for hardware implementation.

As shown, the interface card 200 may further include bus interface logic 216 and a control/data bus 218. In the preferred embodiment, the interface card 114 is a PCI bus-compliant interface card adapted for coupling to the PCI bus of the host computer 102, or adapted for coupling to a PXI (PCI eXtensions for Instrumentation) bus. The bus interface logic 216 and the control/data bus 218 thus present a PCI or PXI interface.

The interface card 200 also includes local bus interface logic 208. In the preferred embodiment, the local bus interface logic 208 presents a RTSI (Real Time System Integration) bus for routing timing and trigger signals between the interface card 114 and one or more other devices or cards.

In the embodiment of FIG. 2B, the CPU 212 and memory 214 may not be included on the interface card 200, and thus only the portion of the graphical program which is converted into hardware implementation form is downloaded to the FPGA 206. Thus in the embodiment of FIG. 2B, any supervisory control portion of the graphical program which is necessary or desired to execute in machine language on a programmable CPU is executed by the host CPU in the computer system 102, and is not executed locally by a CPU on the interface card 200.

In the embodiment of FIG. 2C, the CPU 212 may not be included on the interface card 200, i.e., the interface card 200 includes the FPGA 206 and the memory 214. In this embodiment, the memory 214 is used for storing FPGA state information.

Figure 3A:
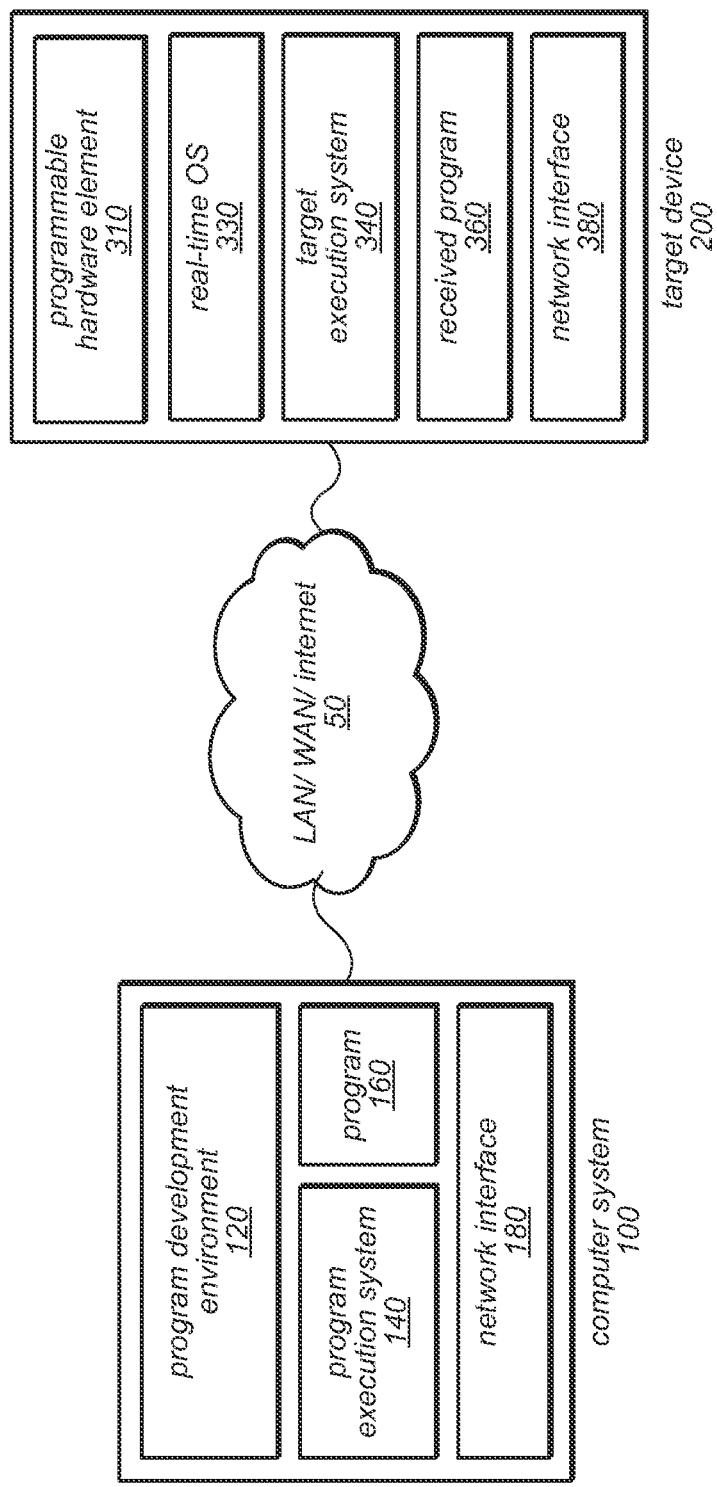
FIG. 3A is a block diagram of the exemplary system of FIGS. 1A and 1B, according to one embodiment.

FIG. 3A—Block Diagram of the Exemplary System

FIG. 3A is a block diagram of the exemplary system of FIGS. 1A and 1B, according to one embodiment. In the embodiment shown in FIG. 3A, the computer system 100 includes a development environment 120, which facilitates development of programs for implementing desired functions or operations, as well as a program execution system 140, also referred to as the execution system 140. The execution system 140 may be operable to execute programs developed with the program development environment 120 (or other program development environments).

As used herein, the term "execution system" may include at least one software program that is designed to execute a certain class of programs. For example, LabVIEW programs utilize an execution system (a LabVIEW graphical program execution engine) that executes in a system in order to execute LabVIEW graphical programs.

As FIG. 3A also shows, the computer system 100 may also store one or more programs 160 which are executable via the execution system 140 (or portions thereof) to perform specified functions or operations, as desired. In the embodiment shown, the program 160 may be stored for transferal to the target device 200 for execution. The computer system 100 may also include a network interface 180 for communicating over a network with devices on the network 50. For example, the network interface 180 may be an Ethernet interface for communicating over the Internet.

In the embodiment of FIG. 3A, the target device 200 may also include an operating system 330, e.g., a real-time operating system (OS), for managing program execution, managing device resources, and communications in real time devices, as is well known in the art. Examples of real-time operating systems 330 include, but are not limited to, Linux, NetBSD, vxWorks, eCos, and Windows CE. Due to size and performance issues, the eCos real-time operating system may be particularly suitable for use in the target device 200, although other real-time operating systems are also contemplated. The target device 200 may also include a target execution system 340, which may be an embedded graphical program execution system, and which may include a subset of the execution system 140 stored on the computer system 100, mentioned above. The target execution system 340 may be optimized to minimize the memory footprint on the target device 200. In one embodiment, the target execution system 340 may comprise an execution system virtual machine.

The target execution system 340 may facilitate execution of program(s) 160 by the target device 200. More specifically, the program 160 stored on the computer system 100 may be transferred to the target device 200, e.g., over the network 50 via the network interface 380 of real time target 200. The received program 360 may be directly executable by the target device 200. The target embedded device 200 may also include software for performing various functions, such as a program linker/loader, which in various embodiments may be comprised in the real time OS, the minimal execution system 340, or may be stored and executed as a separate program.

As shown, the target device 200 may include a programmable hardware element 310. As described herein, the programmable hardware element may be configured with a hardware description that is generated at the host computer 100. In various embodiments, the programmable hardware element may operate in conjunction with the real time OS 330, target execution system 340, received program 360, etc. shown in 3A, may operate without the real time OS, or may not be included in the target device 200, as desired. However, in the following sections, the target device may preferably include the programmable hardware element 310.

Figure 3B:
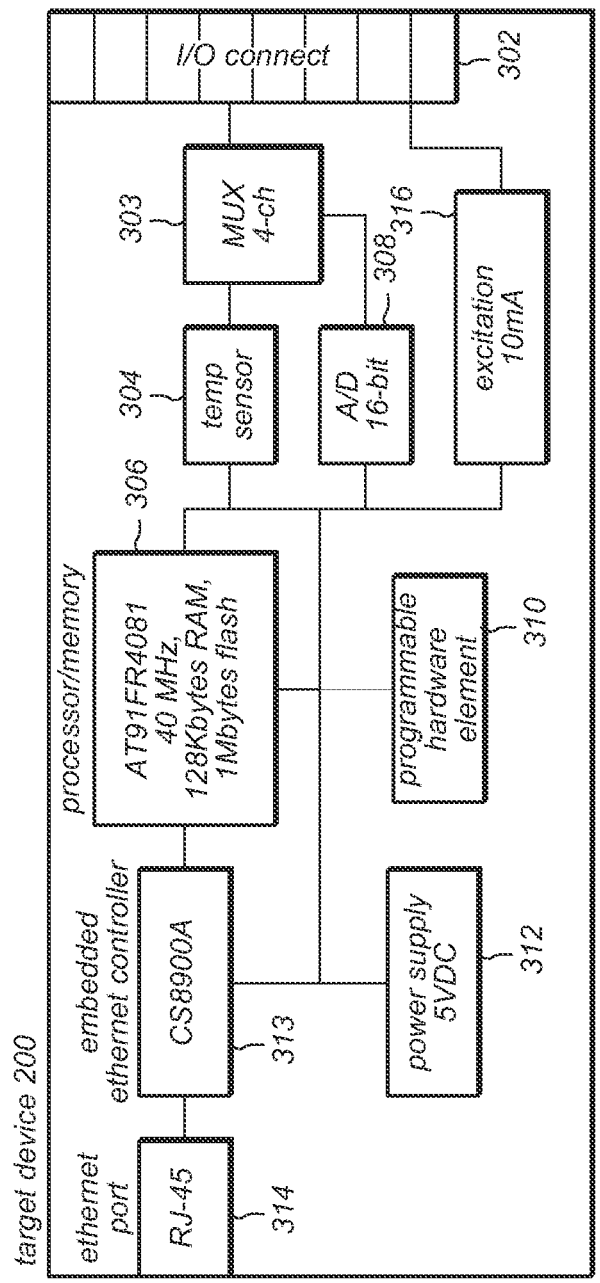
FIG. 3B illustrates a hardware configuration of an exemplary target device, according to one embodiment.
Figure 3C:
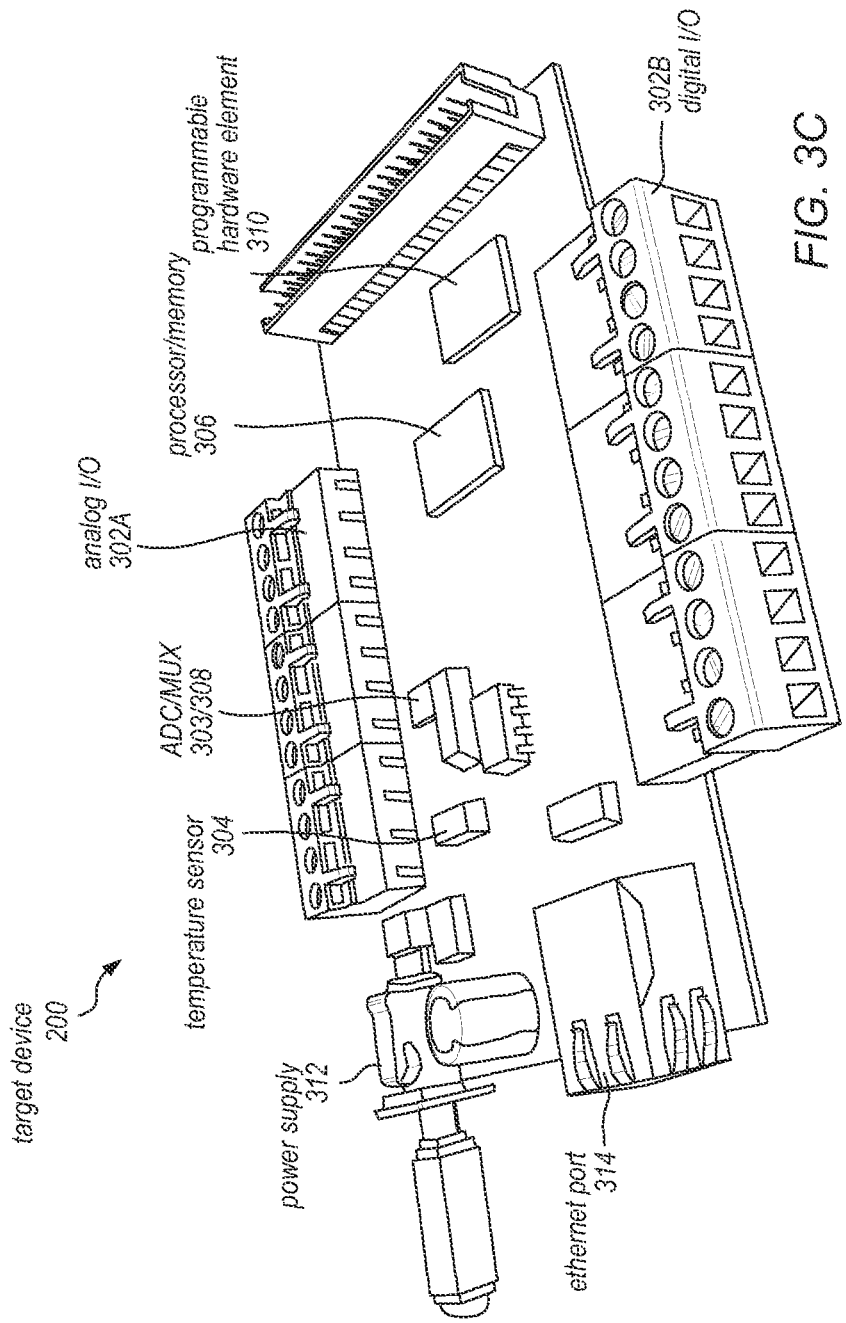
FIG. 3C illustrates the embedded hardware of FIG. 3B, according to one embodiment.

FIGS. 3B and 3C—Embedded Device Hardware Configuration

FIG. 3B illustrates a hardware configuration of one embodiment of the target device 200, as shown in the previous Figures. It should be noted that the embodiment shown is intended to be exemplary only, and is not meant to limit the target device 200 to any particular architecture, components, size, or form.

In the embodiment shown in FIG. 3B, the target device 200 may include an I/O connector 302 coupled to a 4-channel multiplexer (MUX) 303, connected to a 4-channel 16-bit ADC 308, a temperature sensor 304, a micro-controller with internal flash program memory and data SRAM 306, programmable hardware element 310, and Ethernet port 314 (e.g., controlled by embedded Ethernet controller 313). In this embodiment, power is provided by a 5 volt DC power supply 312. The processor 306, an ATMEL ARM Thumb AT91FR4081, may have a high-performance 32-bit RISC architecture with high-density 16-bit instruction set and very low power consumption. By combining the micro-controller, featuring 136 Kbytes on on-chip SRAM and a wide range of peripheral functions, with 8 Mbits of Flash memory in a single compact 120-ball BGA package, the Atmel AT91FR4081 306 provides a powerful, flexible, and cost-effective solution to the minimal embedded control application. Significant board size reduction is also noted as a benefit.

FIG. 3C illustrates the embedded hardware of FIG. 3B, according to one embodiment. As FIG. 3C shows, the hardware components included in the target device 200 facilitate an extremely compact form factor. Additionally, the I/O 302 may be separated as Analog I/O 302A and Digital I/O 302B, according to some embodiments.

Figure 4:
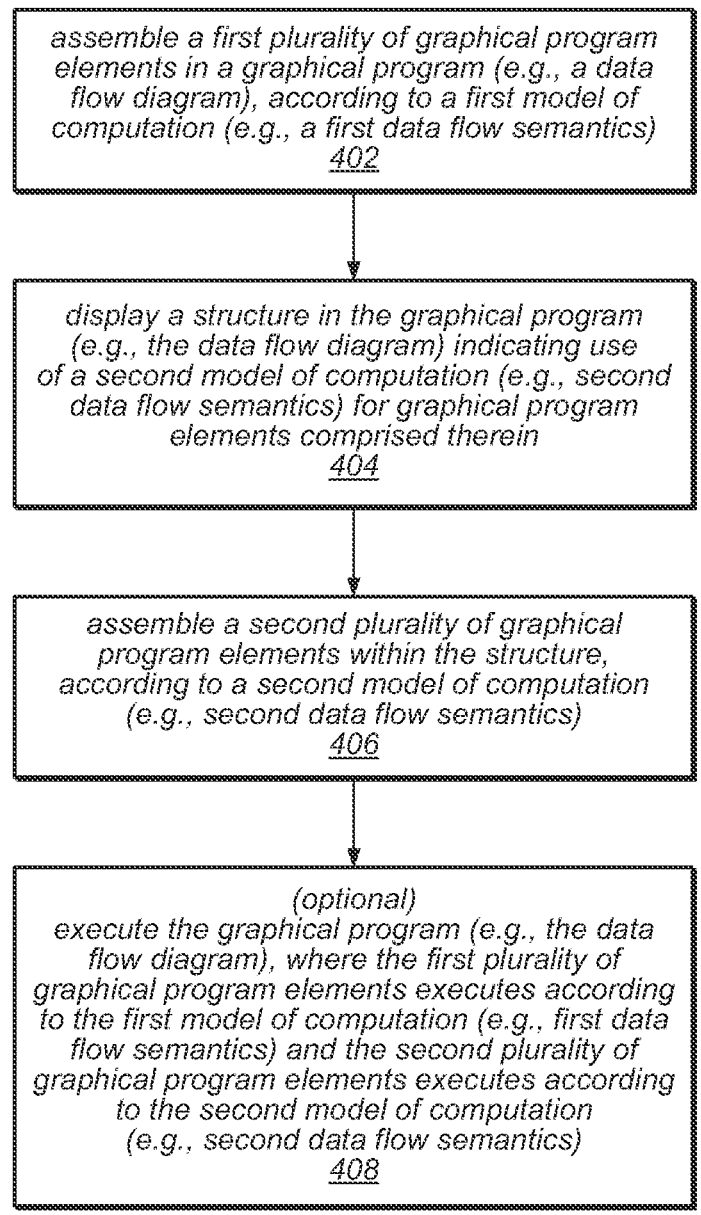
FIG. 4 is a flowchart diagram illustrating one embodiment of a method for creating a graphical program including a plurality of computational models.

FIG. 4—Creating a Graphical Program Including a Plurality of Computational Models FIG. 4 illustrates one embodiment of a method for creating a graphical program that uses multiple models of computation. One example of a graphical program that uses multiple models of computation is a data flow diagram with multiple data flow semantics. Other examples of a graphical program that uses multiple models of computation are graphical programs that include two or more of data flow, control flow, state diagram, textual program, simulation diagram, physical simulation, etc. in the same graphical program.

While the method of FIG. 4 is described in terms of a data flow diagram with multiple data flow semantics, it should be noted that the method also generalizes to multiple models of computation included in a single graphical program, the data flow embodiment described being but an example of the more general approach. Note that while the term "model of computation" is more general than "data flow semantic", in a data flow application, i.e., where the graphical program is a data flow diagram that only implements or represents data flow as opposed to also including other models of computation, such as state diagrams, control flow, etc., the terms may be used synonymously.

The graphical program having the multiple models of computation may be contained in a single "document" or "program". Thus, for example, when the graphical program is displayed on a display, in one embodiment each of the multiple models of computation may be displayed together at the same time on the display, e.g., in a single window on the display. As another example, the graphical program having the multiple models of computation may be contained in a single "document" or "program" where one or more of the models are represented hierarchically as nodes or sub-programs in main program displayed on the display.

The method shown in FIG. 4 may be used in conjunction with any of the computer systems or devices shown in the above Figures, among other devices. In various embodiments, some of the step shown may be performed concurrently, in a different order than shown, or may be omitted. Additional steps may also be performed as desired. As shown, this method may operate as follows.

In 402, a first plurality of graphical program elements may be assembled in a data flow diagram, e.g., a graphical program, in response to first input, where the assembled first plurality of graphical program elements have first data flow semantics. In other words, the assembled first plurality of graphical program elements may comprise a first portion of the data flow diagram in accordance with first data flow semantics. For example, the user may arrange on a display a plurality of nodes or icons and then interconnect the nodes to create the data flow diagram. In response to the user assembling the data flow diagram, data structures may be created and stored which represent the data flow diagram. The data flow diagram may thus comprise a plurality of interconnected nodes or icons which visually indicates the functionality of the data flow diagram. Note that the data flow diagram may also be considered to be a graphical program, or a portion of a graphical program. As noted above, the data flow diagram (graphical program) may comprise a block diagram and may also include a user interface portion or front panel portion. Where the data flow diagram includes a user interface portion, the user may optionally assemble the user interface on the display. As one example, the user may use the LabVIEW graphical programming development environment to create the data flow diagram or graphical program.

In response to the user arranging on the screen the graphical program, the method may develop and store a tree of data structures which represent the graphical program. Thus, as the user places and arranges on the screen function nodes, first nodes, input/output terminals, and connections or wires, etc., the method may develop and store a tree of data structures which represent or specify the graphical program. More specifically, as the user assembles each individual node and wire, the graphical programming system operates to develop and store a corresponding data structure in the tree of data structures which represents the individual portion of the graphical program that was assembled.

In an alternate embodiment, the data flow diagram may be created by the user creating or specifying a prototype, followed by automatic or programmatic creation of the data flow diagram from the prototype. This functionality is described in U.S. patent application Ser. No. 09/587,682 titled "System and Method for Automatically Generating a Graphical Program to Perform an Image Processing Algorithm", which was incorporated by reference above. Alternatively, the graphical program may simply be automatically created with a plurality of models of computation, as described in U.S. Patent Application Publication 2008/0270920, titled "Automatically Generating a Graphical Program with a Plurality of Models of Computation", which was incorporated by reference above. The diagram or program may be created in other manners, either by the user or programmatically, as desired.

In various embodiments, the first data flow semantics of the data flow diagram may be any of a wide variety of different data flow semantics. For example, in a preferred embodiment, the first data flow semantics may specify a homogenous model of computation, as used in LabVIEW data flow diagrams. Said another way, in one embodiment, the first data flow semantics may specify a single rate execution of graphical program elements, e.g., such that each graphical program element or node executes with the same frequency. In one embodiment, a graphical program that has a homogenous model of computation necessarily supports parallelism, e.g., a graphical data flow diagram where the diagram may support concurrent execution paths.

In another embodiment, the first data flow semantics may not include explicit feedback connections to implement looping. In other words, the first data flow semantics may specify iterative processing via an implicit feedback mechanism, such as enclosing the function nodes to be executed iteratively in a graphical loop structure, such as a LabVIEW while or for loop structure, rather than via direct or explicit feedback loops between outputs and inputs of nodes. Thus, in one embodiment, the first data flow semantics may comprise graphical structure nodes that specify looping, wherein the graphical structure nodes do not include explicit feedback connections to implement looping.

In one embodiment, the first data flow semantics may specify a single rate execution of graphical program elements, and may also not include explicit feedback connections to implement looping. In one embodiment, the first data flow semantics may comprise graphical structure nodes that specify conditional branching of operations. Note that in other embodiments, the nodes may be interconnected in control flow or execution flow formats, among other graphical programming formats.

In 404, a structure may be displayed in the data flow diagram, e.g., in response to second input, where the structure indicates use of second data flow semantics for graphical program elements comprised within the structure. In other words, a structure may be placed in the data flow diagram that serves to demarcate between the first plurality of graphical program elements and the second plurality of graphical program elements. For example, in one embodiment, the structure may comprise a loop structure that is operable to enclose, surround, or otherwise visually distinguish graphical program elements comprised in the structure, e.g., from the first plurality of graphical program elements of the data flow diagram. The structure preferably comprises an interior portion, wherein graphical program elements may be assembled and displayed within the interior portion. In a preferred embodiment, the loop structure may be a LabVIEW loop structure, e.g., a for loop or a while loop, as provided in the LabVIEW graphical programming system. Examples of the structure are described in more detail below.

In 406, a second plurality of graphical program elements may be assembled within the structure in response to third input. For example, in one embodiment the structure comprises a timed loop, and so the second plurality of graphical program elements may be placed inside the loop. The assembled second plurality of graphical program elements may comprise a second portion of the data flow diagram, in accordance with the second data flow semantics. As described above, and is well known to those skilled in the art of graphical programming techniques, in assembling the second plurality of graphical program elements in the structure, the user may interconnect the graphical program elements to specify and facilitate data flow between the elements, and may also connect a plurality of the graphical program elements with or to the structure.

In one embodiment, the second data flow semantics specifies a different model of computation than the first data flow semantics, and thus the graphical program may represent a heterogeneous system, in that two different models of computation are included and supported in the graphical program. For example, in one embodiment, the second data flow semantics may support different syntax or formats, and/or a different rate of execution, from that of the first plurality of graphical program elements, e.g., control block notation, explicit feedback, etc., examples of which are described in more detail below. In another embodiment, the second data flow semantics may support multiple modes of execution among the graphical program elements (comprised in the structure), e.g., multiple rates of execution, and thus may use or support a heterogeneous model of computation. As noted above, the method of FIG. 5 is described in terms of data flow diagrams and data flow semantics, although this description is just one example of the more general case involving graphical programs and models of computation.

Note that while embodiments above refer to the nodes of the second model of computation as being contained within a specific structure, it may be possible for the first and second models of computation to be mixed throughout the diagram. Thus, rather than portions of the program being isolated for different models of computation, the nodes of different models of computation may be intermixed throughout the diagram. However, it may be desirable to visually separate the models of computation so that the user can easily discern the different models of computation in the graphical program.

The resulting heterogeneous graphical program may be executable to perform a function, where the graphical program comprises a plurality of interconnected nodes that visually indicate functionality of the data flow diagram. As noted above, in one embodiment, the graphical program may comprise a data flow diagram. In a preferred embodiment, the data flow diagram may be operable to perform the function by executing the first portion of the data flow diagram in accordance with the first data flow semantics, and executing the second portion of the data flow diagram in accordance with the second data flow semantics. In other words, in one embodiment, the assembled graphical program elements of the data flow diagram may execute in accordance with their respective data flow semantics. Thus, the data flow diagram may represent or implement a heterogeneous system (i.e., supporting multiple data flow semantics or models of computation). It should be noted that although in the examples described herein only two different models of computation, e.g., data flow semantics, are utilized, in other embodiments, the number of different models of computation, e.g., data flow semantics supported concurrently in the data flow diagram, may be greater. Note also that in some embodiments, either or all of the two (or more) models of computation supported in the heterogeneous (multiple models of computation) graphical program may be homogenous (single rate) or heterogeneous (multi-rate). It should be further noted that in other embodiments, the graphical program may implement multiple models of computation that may or may not include data flow, but rather, may include any other models of computation as desired, including for example, state diagram, control flow, resource flow, SDF, physical simulation, textual programming, and so forth.

Note also that the function may be any type of function desired. For example, in one embodiment, the data flow diagram may be operable to perform an industrial automation function, a process control function, and/or a test and measurement function, among others. Any other type of function may also be performed as desired, including, for example, functions related to analysis, e.g., data or image analysis, telecommunications, data or image processing, entertainment, science, medicine, and so forth.

Thus, the data flow diagram may optionally be executed to perform the function, as indicated in 408. In an embodiment where the data flow diagram includes a graphical user interface portion and a block diagram portion, during execution of the data flow diagram, the graphical user interface may be displayed on a display of a first computer system and the block diagram may execute on a second computer system. In another embodiment, described in more detail below, at least a portion of the graphical program may be deployed to a programmable hardware element, e.g., an FPGA, and executed thereon. In other words, in one embodiment, at least a portion of the graphical program may be converted into a form suitable for deployment on a programmable hardware element. The converted at least a portion of the data flow diagram may be deployed onto the programmable hardware element, and the data flow diagram executed, where the converted at least a portion of the data flow diagram is executed on the programmable hardware element.

Figure 5A:
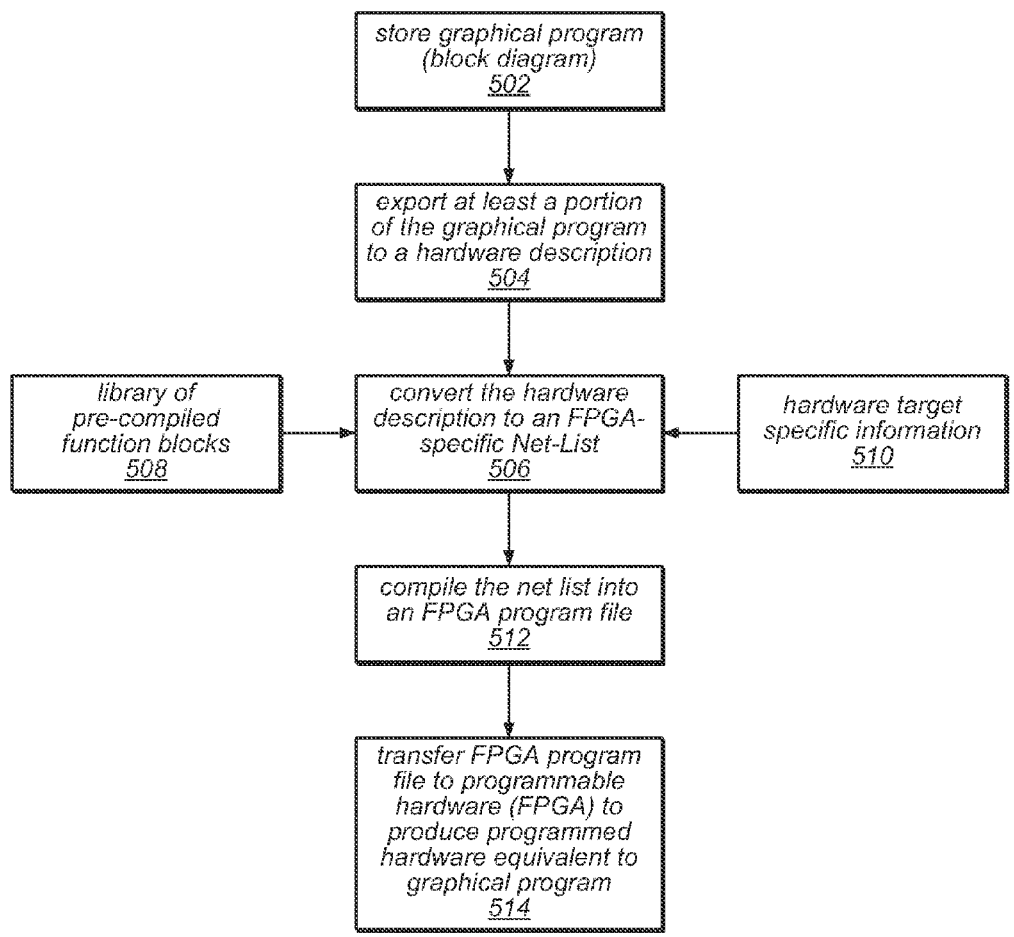
FIGS. 5A and 5B are flowchart diagrams illustrating embodiments of a method for creating a hardware description from a graphical program including a plurality of computational models.

FIG. 5A—Conversion of Graphical Code into a Hardware Implementation

Referring now to FIG. 5A, a flowchart diagram is shown illustrating operation of the preferred embodiment of the present invention. The present invention comprises a computer-implemented method for generating hardware implementations of graphical programs or graphical code which include a plurality of models of computation. It is noted that various of the steps in the flowcharts below can occur concurrently or in different orders.

The method below presumes that a graphical programming development system is stored in the memory of the computer system for creation of graphical programs. As shown, in 502 a graphical program, also sometimes referred to as a block diagram, may be stored. The graphical program may have been created according to method described above in FIG. 4, among other possibilities. Thus, the graphical program stored in 502 may include or be specified according to a plurality of different computational models.

In 504, the method may export at least a portion of the graphical program to a hardware description. Thus, user may create a graphical program and may select an option to export a portion of the graphical program to a hardware description. The hardware description may be a VHDL description, e.g., a VHDL source file, or alternatively is a high level net list description. The hardware description may include a high level hardware description of function blocks, logic, inputs, and outputs which perform the operation indicated by the graphical program. The operation of exporting at least a portion of a the graphical program to a hardware description is discussed in more detail with the flowchart of FIG. 6.

In one embodiment, during creation of the graphical program in step 502 the user specifies portions, e.g. sub VIs, which are to be exported to the hardware description format for conversion into hardware implementation. In another embodiment, when the user selects the option to export a portion of the graphical program to the hardware description format, the user selects which modules or sub-VIs at that time which are to be exported to the hardware description.

In 506, the method may convert the hardware description into an FPGA-specific net list. The net list describes the components required to be present in the hardware as well as their interconnections. Conversion of the hardware description into the FPGA-specific net list is preferably performed by any of various types of commercially available synthesis tools, such as those available from Xilinx, Altera, etc.

In one embodiment, the converting in 506 may utilize one or more pre-compiled function blocks from a library of pre-compiled function blocks 508. Thus, for certain function blocks which are difficult to compile, or less efficient to compile, from a hardware description into a net list format, the hardware description created in 504 includes a reference to a pre-compiled function block from the library 508. The respective pre-compiled function blocks may be simply inserted into the net list in place of these references in step 506. Thus the method may include use of the library 308 of pre-compiled function blocks to create the net list. Hardware target specific information 510 may be used in 306 to convert the hardware description into a net list which is specific to a certain type or class of FPGA.

In 512, the method may compile the net list into an FPGA program file, also referred to as a software bit stream. The FPGA program file is a file that can be readily downloaded to program an FPGA.

After the net list has been compiled into an FPGA program file in 512, in step 514, the method may transfer the FPGA program file to the programmable hardware, e.g., the FPGA, to produce a programmed or configured hardware equivalent to the graphical program. Thus, upon completion of 514, the portion of a graphical program referenced in step 504 may be comprised as a hardware implementation in an FPGA or other programmable hardware element.

It is noted that various of the above steps can be combined and/or can be made to appear invisible to the user. For example, steps 506 and 512 can be combined into a single step, as can steps 504 and 506. In some embodiments, after the user creates the graphical program in step 502, the user simply selects a hardware export option and indicates the hardware target or destination, causing steps 504-514 to be automatically performed.

Figure 5B:
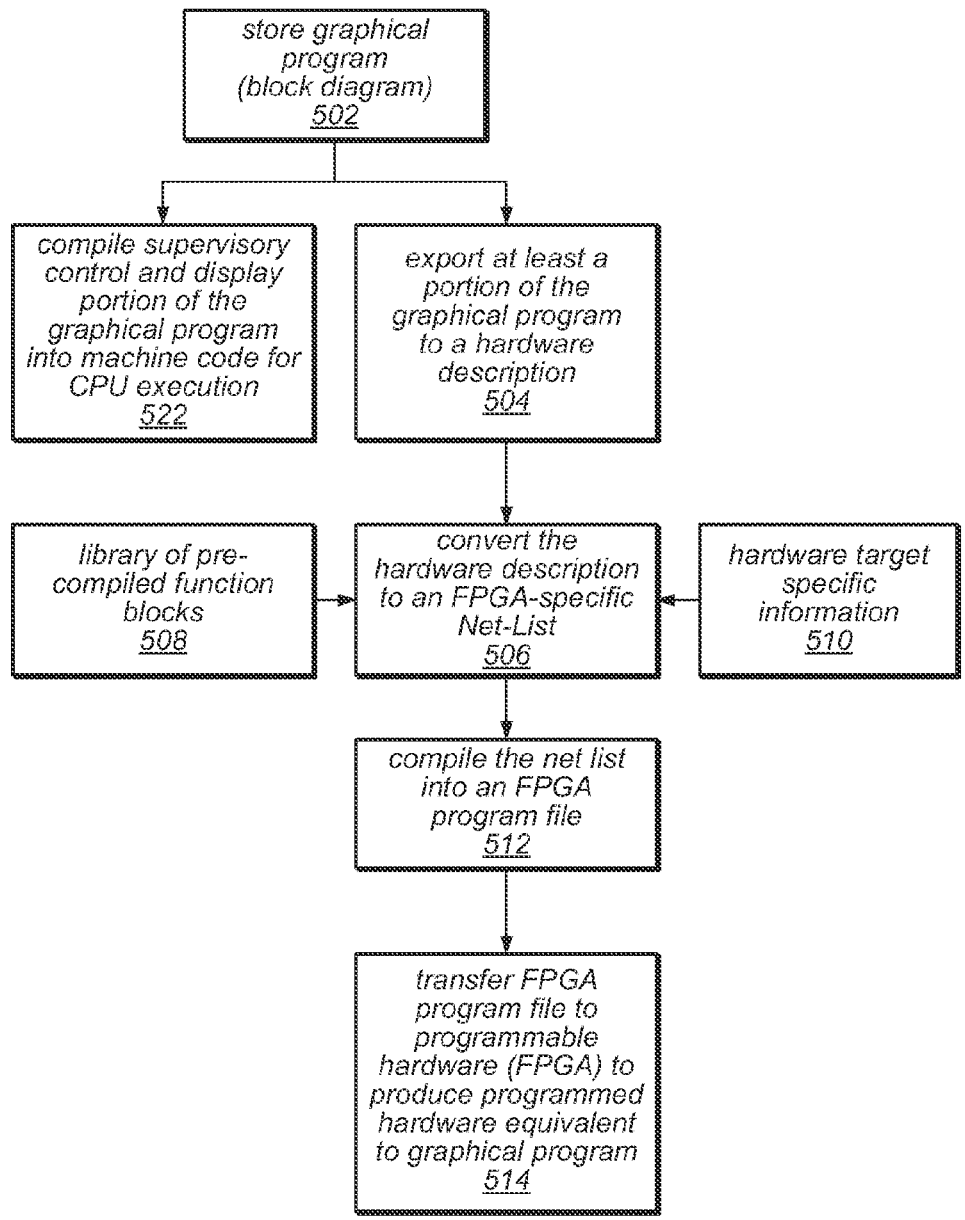

FIG. 5B—Conversion of a Graphical Program into Machine Language and Hardware Implementations FIG. 5B is a more detailed flowchart diagram illustrating an embodiment for conversion of a graphical program into machine language and hardware implementations. As noted above, the graphical program may include a plurality of different models of computation.

As shown in FIG. 5B, after storing the graphical program in 502, the user can optionally select a first portion to be compiled into machine code for CPU execution as is normally done. In one embodiment, the user preferably selects a supervisory control and display portion of the graphical program to be compiled into machine code for a CPU execution. The first portion comprising supervisory control and display portions may be compiled for execution (522) on a CPU, such as the host CPU in the computer 100 or the CPU 212 comprised on the interface card 114. This enables the supervisory control and display portions to execute on the host CPU, which may be optimal for these elements of the program.

The user may select a second portion for conversion to hardware implementation, which may be performed as described above in steps 304-314 of FIG. 4. The portion of the graphical program which is desired for hardware implementation preferably comprises modules or VIs which require a fast or deterministic implementation and/or are desired to execute in a stand-alone hardware unit. In general, portions of the graphical program which are desired to have a faster or more deterministic execution are converted into the hardware implementation. In one embodiment, the entire graphical program is selected for conversion to a hardware implementation, and thus 522 is not performed.

Figure 6:
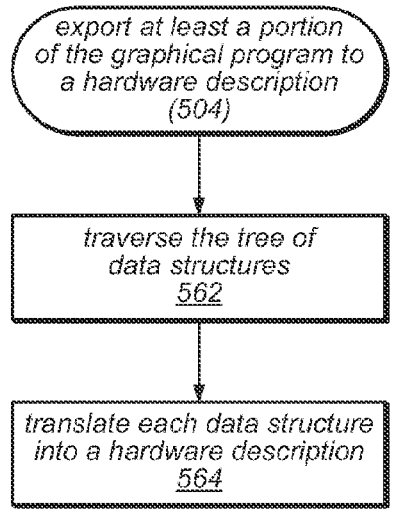
FIG. 6 is a flowchart diagram illustrating one embodiment of a method for exporting a portion of a graphical program to a hardware description.

FIG. 6—Exporting a Portion of the Graphical Program to a Hardware Description

FIG. 6 is a flowchart diagram of 504 of FIGS. 5A and 4B, illustrating operation when the method exports a portion of the graphical program into a hardware description. As indicated above, data structures representing the graphical program may include a tree of data structures and may specifically comprise a hierarchical tree of data structures based on the hierarchy and connectivity of the graphical program. As shown, in 562 the data structures (e.g., the tree of data structures) may be traversed and in 564 the method operates to translate each data structure into a hardware description format. In one embodiment, the method first flattens the tree of data structures prior to traversing the tree in 562.

A number of different function icons and/or primitives can be placed in a diagram or graphical program for conversion into a hardware implementation. These primitives include, but are not limited to, function nodes, constants, global variables, control and indicator terminals, first nodes, and sub-VIs, etc. Function icons or primitives can be any data type, but in the current embodiment are limited to Integer or Boolean data types. Also, global variables are preferably comprised on a single global panel for convenience. If a VI appears multiple times, then the VI is preferably re-entrant and may have state information. If a VI is not re-entrant, then preferably multiple copies of the VI are created in hardware if the VI has no state information, otherwise it would be an error.

Note that there may be a library of nodes, icons, primitives, functions, etc. for each type of computational model. Accordingly, based on the types of nodes used and/or the type of computational model, corresponding libraries may be used to convert each portion of the graphical program to a hardware description, e.g., similar to the methods described below. Thus, while the below portion describes a set of nodes that may be particularly devoted to graphical data flow programs, it may be expanded for any type of computational model. For example, there may be a library of pre-compiled hardware descriptions for various types of states or transitions for a statechart model of computation; various circuit elements (such as resisters, capacitors, etc.), modeled devices, mechanical objects, hydrodynamic elements, etc. for physical simulation models of computation; and/or other types of elements for other types of models of computation. Indeed, instead of nodes, the method may apply to available textual functions for a computational model that includes textual code.

In one embodiment, each node which is converted to a hardware description includes an Enable input, a Clear_Enable signal input, a master clock signal input and an Enable_Out or Done signal. The Enable input guarantees that the node executes at the proper time, i.e., when all of its inputs have been received. The Clear_Enable signal input is used to reset the node if state information remembers that the node was done. The Enable_Out or Done signal is generated when the node completes and is used to enable operation of subsequent nodes which receive an output from the node. Each node which is converted to a hardware description also includes the data paths depicted in the graphical program.

For While loop structures, Iteration structures, Sequence structures, and Case Structures, the respective structure is essentially abstracted to a control circuit or control block. The control block includes a diagram enable out for each sub-diagram and a diagram done input for each sub-diagram.

In addition to the above signals, e.g., the Enable input, the Clear_Enable signal input, the master clock signal input, and the Enable_Out or Done signal, all global variables have numerous additional signals, including CPU interface signals which are specific to the type of CPU and bus, but typically include data lines, address lines, clock, reset and device select signals. All VIs and sub-VIs also include CPU interface signals if they contain a global variable.

In some embodiments, when an icon is defined for a VI used solely to represent a hardware resource connected to the FPGA, e.g., an A/D converter, with a number of inputs and outputs, a string control is preferably placed on the front panel labeled VHDL. In this case, the default text of the string control is placed in the text file created for the VHDL of the VI. Thus, in one embodiment, a library of VIs are provided each representing a physical component or resource available in or to the FPGA. As these VHDL files representing these VIs are used, the method of the present invention monitors their usage to ensure that each hardware resource is used only once in the hierarchy of VIs being exported to the FPGA. When the VHDL file is written, the contents of the string control are used to define the access method of that hardware resource.

The following is pseudo-code which describes the operations performed in the flowchart of FIG. 6:

GenCircuit (vi)
    send GenCircuit to top level diagram of vi
Diagram: GenCircuit(d)
    send GenCircuit to each constant in d
    send GenCircuit to each node in d
    send GenCircuit to each signal in d
Signal: GenCircuit(s)
    declare type of signal s
BasicNode:GenCircuit(n)
    declare type of component needed for n
    declare AND-gate for enabling n (if needed)
    list connections for all node inputs
    list connections for all inputs to enabling AND-gate (if needed)
Constant: GenCircuit(c)
    declare type and value of constant c WhileLoopNode:GenCircuit(n)
   declare while loop controller component
   declare AND-gate for enabling n (if needed)
   list connections for all node inputs
   list connections for all inputs to enabling AND-gate (if needed)
   declare type of each shift register component
   list connections for all inputs to all shift registers
   declare type of each tunnel component
   list connections for all inputs to all tunnels
CaseSelectNode:GenCircuit (n)
   declare case select controller component
   declare AND-gate for enabling n (if needed)
   list connections for all node inputs
   list connections for all inputs to enabling AND-gate (if needed)
   declare type of each tunnel component
   list connections for all inputs to all tunnels
SequenceNode:GenCircuit (n)
   declare sequence controller component
   declare AND-gate for enabling n (if needed)
   list connections for all node inputs
   list connections for all inputs to enabling AND-gate (if needed)
   declare type of each tunnel component
   list connections for all inputs to all tunnels
SubVINode:GenCircuit (n)
   send GenCircuit to the subVI of n
   associate inputs & outputs of subVI with those of n
   declare AND-gate for enabling n (if needed)
   list connections for all node inputs
   list connections for all inputs to enabling AND-gate (if needed)

Referring to the above pseudo code listing, the method may start at the VI level (the top level) and begins generation of VHDL by sending a message to the top level diagram. The method in turn effectively provides a message from the diagram to each constant, each node, and each signal in the diagram.

For signals, the method may then declare the signal type.

For basic nodes, the method may declare a type of the component needed, and also declare an AND-gate with the proper number of inputs needed in order to enable itself. In other words, basic nodes declare an AND-gate with a number of inputs corresponding to the number of inputs received by the node. Here, optimization may be performed to minimize the number of inputs actually needed. For example, if a node has three inputs, the node does not necessarily need a three input AND-gate if two of those inputs are coming from a single node. As another example, if one input comes from node A and another input comes from node B, but node A also feeds node B, then the input from node A is not needed in the AND gate. Thus various types of optimization are performed to reduce the number of inputs to each AND gate. For the basic node, the method also lists the connections for all of its inputs as well as the connections for all inputs to the enabling AND-gate.

For a constant, the method may simply declare the type and the value of the constant.

For a While loop, the method may declare a While loop controller component. The method also declares an AND-gate, lists AND-gate inputs, and lists node inputs in a similar manner to the basic node described above. The method then declares the type for each shift register and includes a component for the shift register, and lists all the connections for the shift register inputs. If any tunnels are present on the While loop, the method declares the type of each tunnel component and list the connections for the inputs to the tunnels. For most tunnels, the method simply equivalences the signals for the inside and outside, without any effect.

The method may proceed in a similar manner for Case and Sequence structures. For Case and Sequence structures, the method declares a case select controller component or a sequence controller component, respectively. For both Case and Sequence structures, the method also declares an AND-gate, lists AND-gate inputs, and lists node inputs in a similar manner to the basic node described above. The method then declares the component needed for any tunnels and list the connections for the inputs to the tunnels.

For a sub-VI, the method may send a message to the sub-VI and associates inputs and outputs of the sub-VI with those of n. The method may then declare an AND-gate, lists AND-gate inputs, and lists node inputs in a similar manner to the basic node described above.

Figure 7:
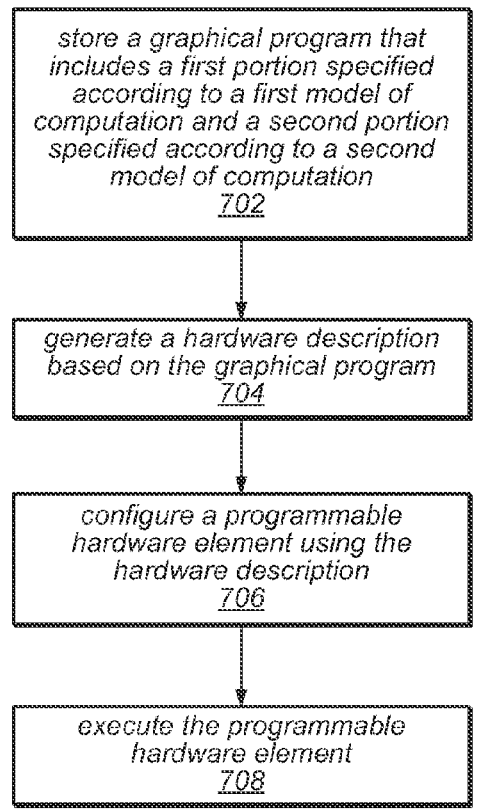
FIG. 7 is a flowchart diagram illustrating one embodiment of a method for generating a hardware description based on a graphical program including a plurality of computational models.

FIG. 7—Generating a Hardware Description Based on a Graphical Program with a Plurality of Models of Computation FIG. 7 illustrates one embodiment of a method for generating a hardware description for a programmable hardware element based on a graphical program having multiple models of computation. The method shown in FIG. 7 may be used in conjunction with any of the methods, computer systems, or devices described herein. In various embodiments, some of the step shown may be performed concurrently, in a different order than shown, or may be omitted. Additional steps may also be performed as desired. As shown, this method may operate as follows.

In 702, a graphical program may be received (e.g., over a network) and/or stored on a memory medium. The graphical program may also be provided for display on a display of a computer system. Thus, the user may be able to view and/or modify the graphical program on the display. The graphical program may have been assembled manually or automatically, as already described above. As also indicated above, the graphical program may include portions which are specified according to a plurality of different models of computation. In some embodiments, two portions of the graphical program (described in more detail below) may be displayed within the same user interface or window or may be separated among a plurality of different user interfaces or windows, as desired.

In one embodiment, the graphical program may include a first portion having a first computational model and a second portion having a second computational model. The models of computation may be any of various models of computation, e.g., including data flow (e.g., graphical data flow), state diagram or statechart, time-based simulation diagram, synchronous data flow, textual (e.g., text-based programming language, such as a mathematical scripting language), execution flow, control flow, or physical simulation (e.g., of devices, circuits, mechanical systems, hydrodynamic systems, etc.), among others.

In one particular embodiment, the first portion of the graphical program may include a first plurality of interconnected nodes that visually indicates functionality of the first portion of the graphical program, and the second portion of the graphical program may include a second plurality of interconnected nodes that visually indicates functionality of the second portion of the graphical program. Thus, the first and second portions (and correspondingly, models of computation) may be graphical in nature, e.g., as opposed to textual based models of computation. Thus in this embodiment the graphical program may have multiple graphical models of computation. Alternatively, or in addition, the graphical program may have one or more other portions (and/or the first and/or second portions may include sub portions) which may be specified according to textual models of computation, as desired. Thus, the graphical program may include additional portions which are specified according to further non-graphical models of computation (e.g., textual models of computation).

In some embodiments, the second graphical program portion may be included in a structure (e.g., which indicates the model of computation of the second graphical program portion) of the graphical program. Thus, the second plurality of interconnected nodes may be contained within a structure. However, in alternate embodiments, as indicated above, it may be possible that the first portion and second portion of the graphical program are intermixed (i.e., not separated). Various intermediates between these embodiments are envisioned, e.g., where the first portion and second portion have a plurality of subportions which are interconnected.

The graphical program may be comprised in a single "document". In other words, each of the multiple models of computation of the graphical program may be comprised in a single document. Thus, this embodiment is not merely one program portion having a first model of computation making a function call to a separate program in a different document having a different computational model. Rather, in this embodiment a single graphical program contained within a single "document" includes multiple portions with different models of computation.

In 704, a hardware description may be generated based on the graphical program received in 702. The hardware description may describe a hardware implementation of the graphical program, and may be used (or configured to) configure a programmable hardware element to implement functionality of the graphical program. In one embodiment, the hardware description may be generated such that it has a first portion which corresponds to the first portion of the graphical program and may have a second portion which corresponds to the second portion of the graphical program. The hardware description may specify that the first portion communicates with the second when executed by a programmable hardware element, such as an FPGA. Accordingly, once configured according to the hardware description, a first portion of the programmable hardware element may implement the functionality of the first portion of the graphical program and a second portion of the programmable hardware element may implement the functionality of the second portion of the graphical program. During execution, the two portions of the programmable hardware element may communicate with each other, e.g., as specified by the graphical program and/or by the generated hardware description.

In further embodiments, the hardware description may not include distinct portions that communicate with each other. For example, instead of having independent functionality specified by the hardware description (e.g., based on the first and second portions), the first and second portions may be analyzed to determine the overall functionality of the two portions and a hardware description specifying that overall functionality may be generated. This may allow the two portions to be optimized or made more efficient, e.g., by combining different portions or logic of the two different portions in the hardware description. Thus, in some embodiments, the hardware description may specify the overall functionality of the two different portions, but may not resemble the specific, separated logic which, in some embodiments, is specified by the graphical program.

The hardware description may be generated in an automatic fashion, e.g., in response to user input. For example, the user may simply indicate that a hardware description should be generated for the graphical program and software executing on a computer system may automatically generate the hardware description based on the graphical program. Thus, the user may not manually specify or otherwise code the hardware description, but instead, the hardware description may be automatically generated, e.g., by a computer system.

In some embodiments, the hardware description may be generated in a multistep process. For example, the graphical program may be compiled to produce a compiled graphical program and then the hardware description may be generated from the compiled graphical program. In some embodiments, each portion of the graphical program may be compiled and the hardware description may be generated based on the compiled graphical program portions. For example, a front end compiler may be used for each different model of computation to compile each portion of the graphical program. Similarly, each portion of the graphical program may be converted to a common model of computation (e.g., an intermediate data flow language), and the hardware description may be generated from that converted program. However, the hardware description may be generated from the graphical program directly.

In some embodiments, different libraries may be used in converting each of the portions to the hardware description. For example, as indicated above, a different library of conversions or precompiled blocks may be used for each different model of computation. In one embodiment, a different compiler or hardware description converter may be used for each different model of computation in generating the hardware description. For each different model of computation, the methods of 5A, 5B, and 6 may be used (e.g., with different libraries) in generating the hardware description from the graphical program.

In 706, a programmable hardware element may be configured according to the hardware description. More specifically, the hardware description may be deployed to the programmable hardware element such that the programmable hardware element is configured to implement the functionality specified by the hardware description (and correspondingly, the graphical program) upon execution. In some embodiments, the programmable hardware element may be included in various devices, such as real time devices, as indicated above. Thus, 706 may include configuring a device which includes the programmable hardware element, in some embodiments.

In 708, the programmable hardware element may be executed to perform the functionality specified by the graphical program. As indicated above, the programmable hardware element may have portions which correspond to the two portions of the graphical program, and these portions may communicate with each other during execution of the programmable hardware element, e.g., according to the specification of the graphical program. Thus, the two portions of the programmable hardware element may communicate according to the nodes and connections between the nodes specified by the graphical program.

During execution, the programmable hardware element may provide information and/or receive information from a computer system, e.g., which may be used to interact with the executing programmable hardware element. For example, the computer system may execute a front panel or user interface portion of the graphical program and/or may be used to debug the graphical program as it executes on the programmable hardware element, as described in more detail below. Alternatively, or additionally, the user interface portion may be executed by a processor and memory included in a device which also includes the programmable hardware element.

Note that the above method may be expanded to allow a plurality of different graphical program portions (e.g., more than the two described above), where each of the graphical program portions is specified to its own model of computation.

Figure 8:
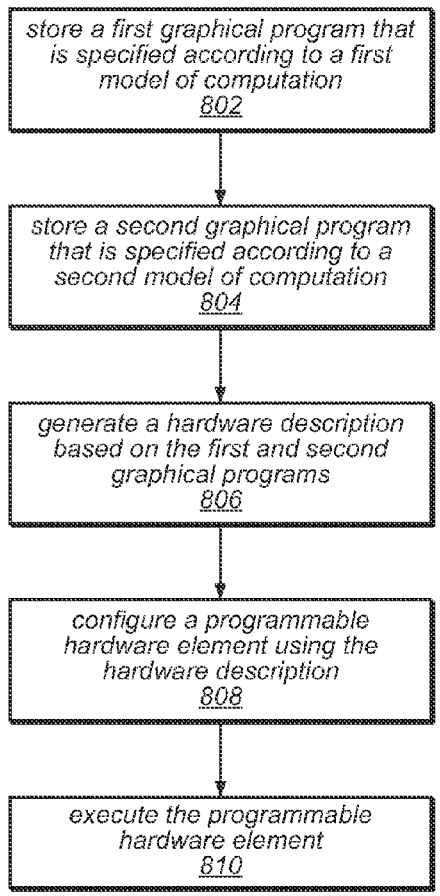
FIG. 8 is a flowchart diagram illustrating one embodiment of a method for generating a hardware description based on a first graphical program specified according to a first computational model and a second program specified according to a second computational model.

FIG. 8—Generating a Hardware Description Based on First and Second Graphical Programs FIG. 8 illustrates one embodiment of a method for generating a hardware description for a programmable hardware element based on a first graphical program having a first model of computation and a second program having a second model of computation. The method shown in FIG. 8 may be used in conjunction with any of the methods, computer systems, or devices described herein. In various embodiments, some of the step shown may be performed concurrently, in a different order than shown, or may be omitted. Additional steps may also be performed as desired. As shown, this method may operate as follows.

In 802, a first graphical program may be received (e.g., over a network) and/or stored on a memory medium. The first graphical program may also be provided for display on a display of a computer system. The first graphical program may have been assembled manually or automatically, as desired. The first graphical program may be specified according to a first model of computation. The first graphical program may include a first plurality of interconnected nodes which visually indicates the functionality of the first graphical program.

In 804, a second program (e.g., a graphical program) may be received (e.g., over a network) and/or stored on a memory medium. The second program may have been assembled manually or automatically, as desired. The second program may be specified according to a second model of computation. The second model of computation may be a different model of computation than the first model of computation. The second program may be a graphical program which includes a second plurality of interconnected nodes which visually indicates the functionality of the second graphical program. However, the second program may be non-graphical in nature. Additionally, the first and/or second graphical programs may include sub portions which may be specified according to other models of computation, e.g., textual models of computation, as desired.

As indicated above, the models of computation for the first graphical program and/or the second program may be specified according to various different possible models of computation. Thus, the models of computation may be any of various models of computation, e.g., including data flow (e.g., graphical data flow), state diagram or statechart, time-based simulation diagram, synchronous data flow, textual (e.g., text-based programming language, such as a mathematical scripting language), execution flow, control flow, or physical simulation (e.g., of devices, circuits, mechanical systems, hydrodynamic systems, etc.), among others.

The second program may also be provided for display on the display of the computer system. In one embodiment, the first and second programs may be provided for concurrent display on the display (or a plurality of displays) of the computer system. For example, the first graphical program may be provided in a first window for display and the second program may be provided in a second window for display. The user may be able to view both the first graphical program and the second program concurrently on the display(s) of the computer system.

The first graphical program and the second program may be configured or specified to communicate with each other to provide an overall functionality. For example, the first graphical program and second program may be configured to provide input and/or output data to each other during execution. In various embodiments, this communication behavior may be specified in a graphical manner, in a textual manner, as settings for one or both of the programs, and/or in other manners, as desired.

In 806, a hardware description may be generated based on the first graphical program and the second program received in 802 and 804. The hardware description may describe a hardware implementation of the graphical programs, and may be used (or configured to) configure a programmable hardware element to implement functionality of the graphical programs. In one embodiment, the hardware description may be generated such that it has a first portion which corresponds to the first graphical program and may have a second portion which corresponds to the second program. The hardware description may specify that the first portion communicates with the second portion when executed by a programmable hardware element, such as an FPGA. Accordingly, once configured according to the hardware description, a first portion of the programmable hardware element may implement the functionality of the first graphical program and a second portion of the programmable hardware element may implement the functionality of the second program (and these portions may communicate as specified by the programs, as indicated above). Thus, during execution, the two portions may communicate with each other, e.g., as specified by the two programs and/or by the generated hardware description.

In further embodiments, the hardware description may not include distinct portions that communicate with each other. For example, instead of having independent functionality specified by the hardware description (e.g., based on the first and second programs), the first and second programs may be analyzed to determine the overall functionality of the two programs and a hardware description specifying that overall functionality may be generated. This may allow the two programs to be optimized or made more efficient, e.g., by combining different portions or logic of the two different programs in the hardware description. Thus, in some embodiments, the hardware description may specify the overall functionality of the two different programs, but may not resemble the specific, separated logic specified by the two different programs.

The hardware description may be generated in an automatic fashion, e.g., in response to user input. For example, the user may simply indicate that a hardware description should be generated for the first and second graphical programs and software executing on a computer system may automatically generate the hardware description based on the graphical programs. Thus, the user may not manually specify or otherwise code the hardware description, but instead, the hardware description may be automatically generated, e.g., by a computer system.

In some embodiments, the hardware description may be generated in a multistep process. For example, each graphical program may be compiled and the hardware description may be generated based on the compiled graphical programs. For example, a front end compiler may be used for each different model of computation to compile each graphical program. Similarly, each graphical program may be converted to a common model of computation (e.g., an intermediate data flow language), and the hardware description may be generated from the converted program(s). However, the hardware description may be generated from the graphical programs directly, i.e., without an intermediary compiling process.

Alternatively, or additionally, a hardware description may be generated for each graphical program, and then the two hardware descriptions may be used to configure a programmable hardware element in 808. The two hardware descriptions may be similar to the two different portions of the hardware description described above. In further embodiments, the two hardware descriptions may be compiled together to form an overall hardware description which may be used to configured the programmable hardware element.

In some embodiments, different libraries may be used in converting each of the programs to the hardware description. For example, as indicated above, a different library of conversions or precompiled blocks may be used for each different model of computation. In one embodiment, a different compiler or hardware description converter may be used for each different model of computation in generating the hardware description. For each different model of computation, the methods of 5A, 5B, and 6 may be used (e.g., with different libraries) in generating the hardware description from the graphical program.

In 808, a programmable hardware element may be configured according to the hardware description. More specifically, the hardware description may be deployed to the programmable hardware element such that the programmable hardware element is configured to implement the functionality specified by the hardware description (and correspondingly, the graphical programs) upon execution. In some embodiments, the programmable hardware element may be included in various devices, such as real time devices, as indicated above. Thus, 808 may include configuring a device which includes the programmable hardware element, in some embodiments.

In 810, the programmable hardware element may be executed to perform the functionality specified by the graphical programs. As indicated above, the programmable hardware element may have portions which correspond to the two graphical programs, and these portions may communicate with each other during execution of the programmable hardware element, e.g., according to the specification of the graphical programs. Thus, the two portions of the programmable hardware element may communicate according to the nodes and connections between the nodes specified by the graphical programs.

During execution, the programmable hardware element may provide information and/or receive information from a computer system, e.g., which may be used to interact with the executing programmable hardware element. For example, the computer system may execute a front panel or user interface portion of the graphical programs and/or may be used to debug the graphical programs as they execute on the programmable hardware element, as described in more detail below. Alternatively, or additionally, the user interface portion may be executed by a processor and memory included in a device which also includes the programmable hardware element.

Note that the above method may be expanded to allow a plurality of different graphical programs (e.g., more than the two described above), where each of the graphical programs is specified to its own model of computation.

Figure 9:
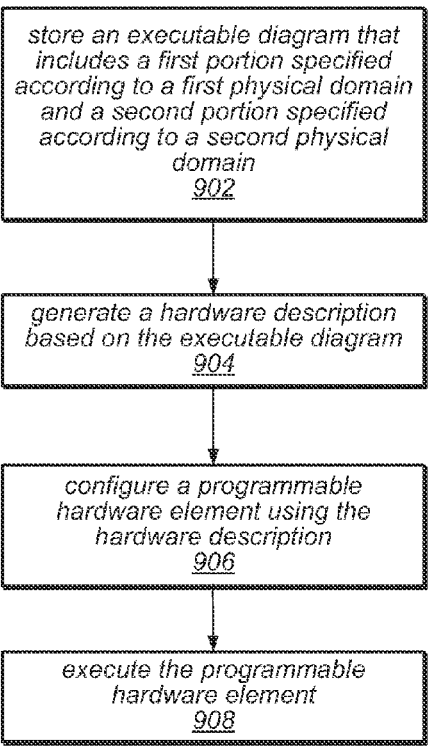
FIG. 9 is a flowchart diagram illustrating one embodiment of a method for generating a hardware description based on an executable diagram that simulates a physical system.

FIG. 9—Generating a Hardware Description Based on a Graphical Program that Simulates a Physical System FIG. 9 illustrates one embodiment of a method for generating a hardware description based on a graphical program that is executable to simulate a physical system. The method shown in FIG. 9 may be used in conjunction with any of the methods, computer systems, or devices described herein. In various embodiments, some of the step shown may be performed concurrently, in a different order than shown, or may be omitted. Additional steps may also be performed as desired. As shown, this method may operate as follows.

In 902, a graphical program may be received (e.g., over a network) and/or stored on a memory medium. The graphical program may be executable to simulate a physical system and may include a front panel or graphical interface portion for interacting with the simulation during execution. The graphical program may simulate physical objects or devices and interactions of those objects, e.g., as apposed to nonphysical mechanics which may not relate to physical objects or devices. For example, the physical simulation may not relate to transformation of a physical movement of a magnet into an induced current, although in further embodiments, this may be possible. Thus, in one embodiment, the graphical program may be specified according to a physical simulation model of computation.

The graphical program may have two or more portions which are specified according to different physical domains, as described below. Thus, the physical simulation model of computation may be further divided into a plurality of different physical domains, which may be specified in the graphical program. Similar to above, the graphical program may also be provided for display on a display of a computer system. Thus, the user may be able to view the graphical program on the display and/or interact with the physical simulation during execution, e.g., using the front panel portion of the graphical program. The graphical program may have been assembled manually or automatically, similar to descriptions above.

In one embodiment, the graphical program may include a first portion which is specified according to a first physical domain and a second portion specified according to a second physical domain. More specifically, the first portion may include a first plurality of nodes and connections for simulating a first portion of the physical system. The first plurality of nodes may represent first physical components of the physical system and the connections may represent physical connectivity between the first physical components. Similarly, the second graphical program portion may include a second plurality of nodes and connections for simulating a second portion of the physical system. The second plurality of nodes may represent second physical components and the connections may represent physical connectivity between the second physical components. Thus, each portion of the graphical program may correspond to different portions of the physical system and may be specified according to different physical domains.

In one embodiment, the physical system may include a circuit and one of the graphical program portions may include a circuit diagram of the circuit. For example, the physical system may include a circuit for controlling one or more other portions of the physical system. Accordingly, the nodes and connections of that portion of the graphical program may correspond to circuit elements and connections between the circuit elements. Thus, the portion of the graphical program may visually specify the circuit portion of the physical system, and may be executable to simulate the circuit.

Alternatively, or additionally, the physical system may include a mechanical system and one of the graphical program portions may include a diagram of the mechanical system. For example, the mechanical system may include conveyers, pulleys, wheels, axels, wires, ropes, and/or other physical objects which may be simulated using the portion of the graphical program. Correspondingly, the nodes and connections of that graphical program portion may correspond to mechanical elements and connections between the mechanical elements. The portion of the graphical program may be executable to simulate the mechanical portion(s) of the physical system.

In further embodiments, the physical system may include a hydrodynamic system and one of the graphical program portions may include a diagram of the hydrodynamic system. For example, the hydrodynamic system may include various pumps, funnels, pipes, etc. Accordingly, the nodes and connections of that graphical program portion may correspond to hydrodynamic elements and connections between the hydrodynamic elements. The portion of the graphical program may be executable to simulate the hydrodynamic portion of the physical system.

In some embodiments, the physical system may include one or more devices, such as electronic devices. In such embodiments, various ones of the nodes may represent a particular device (or portion of a device) which may be usable to simulate operation of the device. For example, one or more of the nodes in the graphical program may represent data acquisition devices, measurement devices, processing systems, units under test, vision systems, etc. Where a node in a graphical program "represents" a physical device, the node may include code executable to interface the physical device, or configure the physical device.

The connections between the devices may represent physical data connections, e.g., wired or wireless connections. In further embodiments, the lines between the devices may also represent or indicate the type of data communication used for the connection, e.g., TCP/IP, USB, FIFO, etc. The portion of the graphical program may be executable to simulate these devices and physical connections between the devices. In some embodiments, this may be referred to as a configuration or system diagram and may be usable to simulate a portion of the physical system, e.g., which corresponds to device simulation. Similar embodiments are described in U.S. Patent Application Publication 2008/0034310 and U.S. patent application Ser. No. 10/113,987, which were incorporated by reference in their entirety above.

In one embodiment, the nodes of the graphical program may be expandable or collapsible, as desired. For example, a node or icon that represents a physical system or device may be expandable to view each of the interconnected physical components of that system or device. For example, a circuit node may be expandable to reveal the corresponding circuit diagram which is executable to simulate the circuit. Thus, in some embodiments, each portion of the graphical program may be represented by an icon, e.g., representing the entirety of the physical system simulated by the portion of the graphical program. Thus, the graphical program may represent a hierarchy of systems.

In some embodiments, the second graphical program portion may be included in a structure (e.g., which indicates the physical domain of the second graphical program portion) of the graphical program. Thus, the second plurality of interconnected nodes may be contained within a structure. However, in alternate embodiments, it may be possible that the first portion and second portion of the graphical program are intermixed (i.e., not separated). Various intermediate embodiments are also envisioned (e.g., with a plurality of small divisions or clumps, among other possibilities).

In 904, a hardware description may be generated based on the graphical program received in 902. The hardware description may describe a hardware implementation of the graphical program and may be used (or configured to) configure a programmable hardware element to implement functionality of the graphical program. In one embodiment, the hardware description may be generated such that it has a first portion which corresponds to the first portion of the graphical program and may have a second portion which corresponds to the second portion of the graphical program. The hardware description may specify that the first portion communicates with the second when executed by a programmable hardware element, such as an FPGA. Accordingly, once configured according to the hardware description, a first portion of the programmable hardware element may implement the functionality of the first portion of the graphical program and a second portion of the programmable hardware element may implement the functionality of the second portion of the graphical program. During execution, the two portions of programmable hardware element may communicate with each other, e.g., as specified by the graphical program and/or by the generated hardware description.

The hardware description may be generated in an automatic fashion, e.g., in response to user input. For example, the user may simply indicate that a hardware description should be generated for the graphical program and software executing on a computer system may automatically generate the hardware description based on the graphical program. Thus, the user may not manually specify or otherwise code the hardware description, but instead, the hardware description may be automatically generated, e.g., by a computer system.

In some embodiments, the hardware description may be generated in a multistep process. For example, the graphical program may be compiled to produce a compiled graphical program and then the hardware description may be generated from the compiled graphical program. In some embodiments, each portion of the graphical program may be compiled and the hardware description may be generated based on the compiled graphical program portions. For example, a front end compiler may be used for each different model of computation to compile each portion of the graphical program. Similarly, each portion of the graphical program may be converted to an intermediate format (e.g., an intermediate data flow language), and the hardware description may be generated from that converted program. However, the hardware description may be generated from the graphical program directly.

In some embodiments, different libraries may be used in converting each of the portions to the hardware description. For example, a different library of conversions or precompiled blocks may be used for each different physical domain. In one embodiment, a different compiler or hardware description converter may be used for each different physical domain in generating the hardware description. For each different physical domain, the methods of 5A, 5B, and 6 may be used (e.g., with different libraries) in generating the hardware description from the graphical program.

In 906, a programmable hardware element may be configured according to the hardware description. More specifically, the hardware description may be deployed to the programmable hardware element such that the programmable hardware element is configured to implement the functionality specified by the hardware description (and correspondingly, the graphical program) upon execution. In some embodiments, the programmable hardware element may be included in various devices, such as real time devices, as indicated above. Thus, 906 may include configuring a device which includes the programmable hardware element, in some embodiments.

In 908, the programmable hardware element may be executed to perform the functionality specified by the graphical program. As indicated above, the programmable hardware element may have portions which correspond to the two portions of the graphical program, and these portions may communicate with each other during execution of the programmable hardware element, e.g., according to the specification of the graphical program. Thus, the two portions of the programmable hardware element may communicate according to the nodes and connections between the nodes specified by the graphical program.

During execution, the programmable hardware element may provide information and/or receive information from a computer system, e.g., which may be used to interact with the simulation of the physical system. For example, the computer system may execute a front panel or user interface portion of the graphical program and/or may be used to debug the graphical program as it executes on the programmable hardware element, as described in more detail below. Alternatively, or additionally, the user interface portion may be executed by a processor and memory included in a device which also includes the programmable hardware element.

Note that the above method may be expanded to allow a plurality of different graphical program portions (e.g., more than the two described above), where each of the graphical program portions is specified to its own physical domain.

In further embodiments, similar to the method of FIG. 8 in relation to the method of FIG. 7, the portions of the graphical program above may be separated as two different graphical programs. Correspondingly, those two graphical programs may be implemented on the programmable hardware element. Thus, instead of a graphical program which includes two portions, two different graphical programs (each with different physical domains) may be implemented on a programmable hardware element.

FIGS. 10A-16—Exemplary Diagrams

Figure 10A:
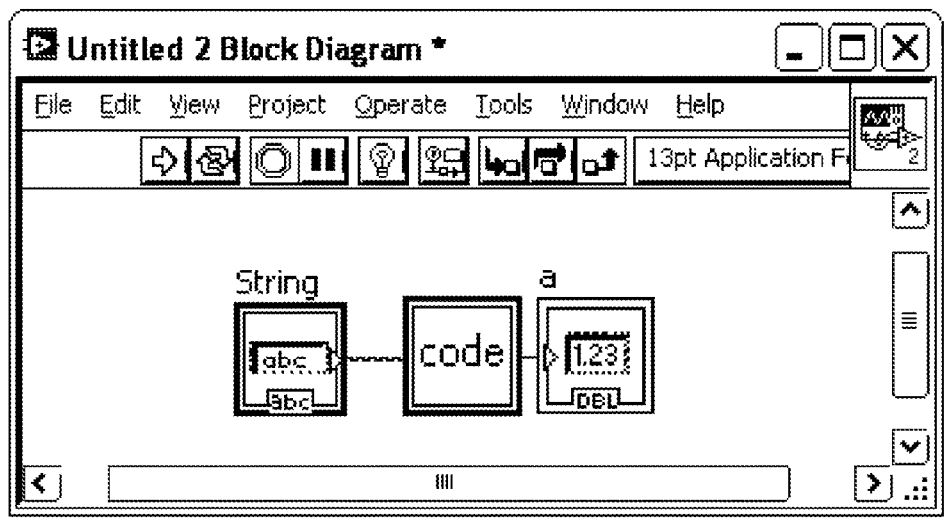
FIG. 10A is a high level illustration of a simple graphical program that includes a textual portion, according to one embodiment.
Figure 10B:
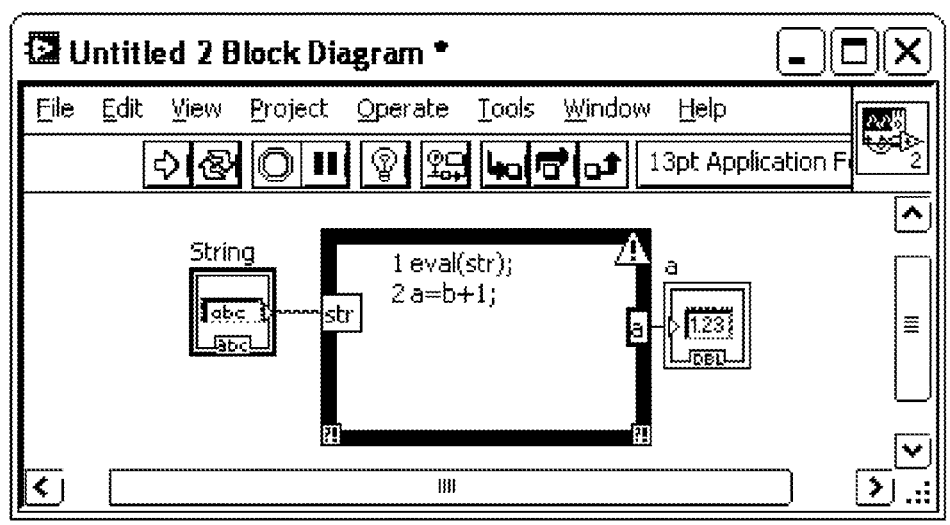
FIG. 10B is a more detailed illustration of a simple graphical program that includes a textual portion, according to one embodiment.

FIGS. 10A and 10B illustrate simple graphical programs which include textual program portions. Thus, FIGS. 10A and 10B illustrate a graphical program specified according to two different models of computation (graphical data flow and textual).

Figure 11A:
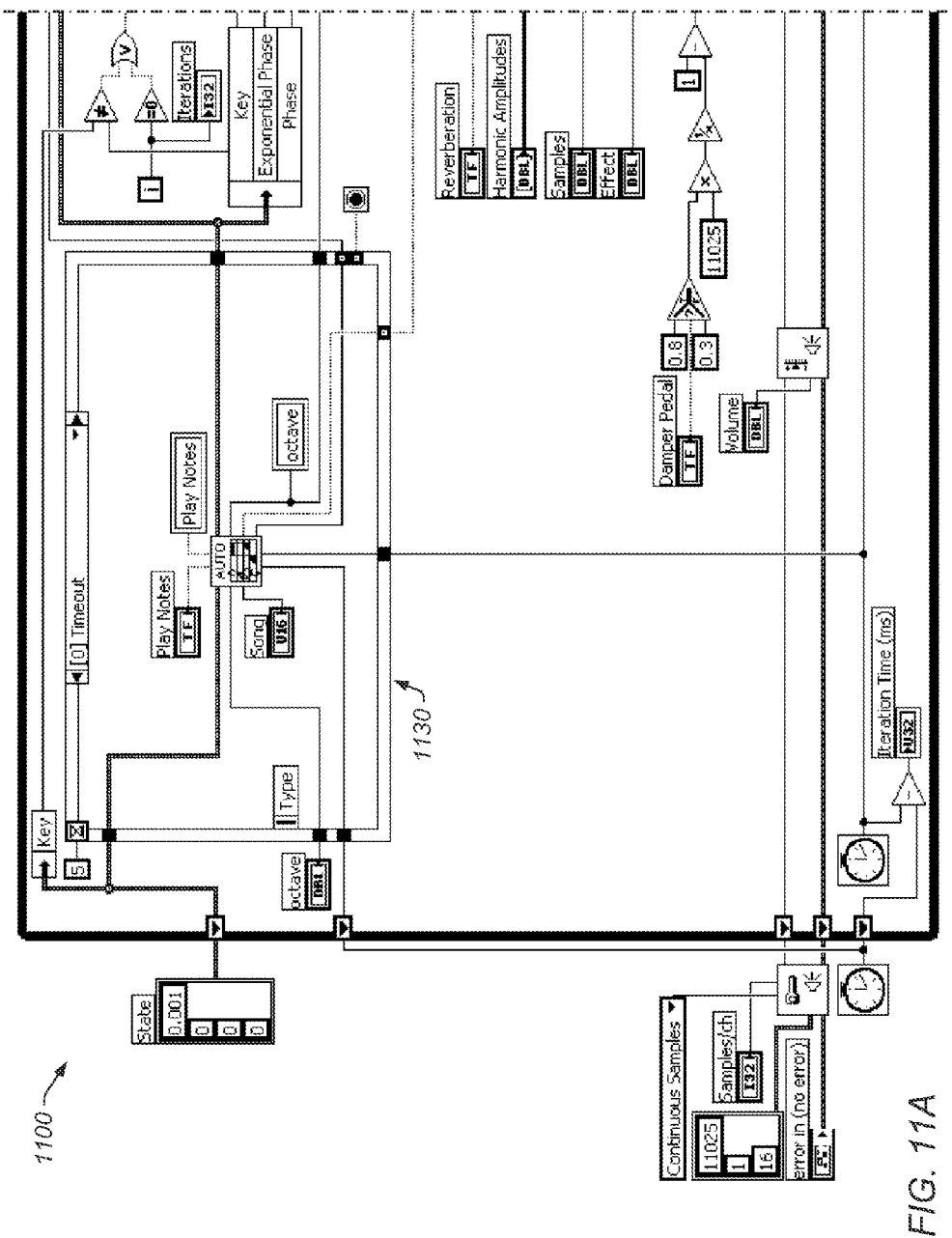
FIG. 11A illustrates a first portion of an exemplary graphical program that includes a first computational model, according to one embodiment.
Figure 11B:
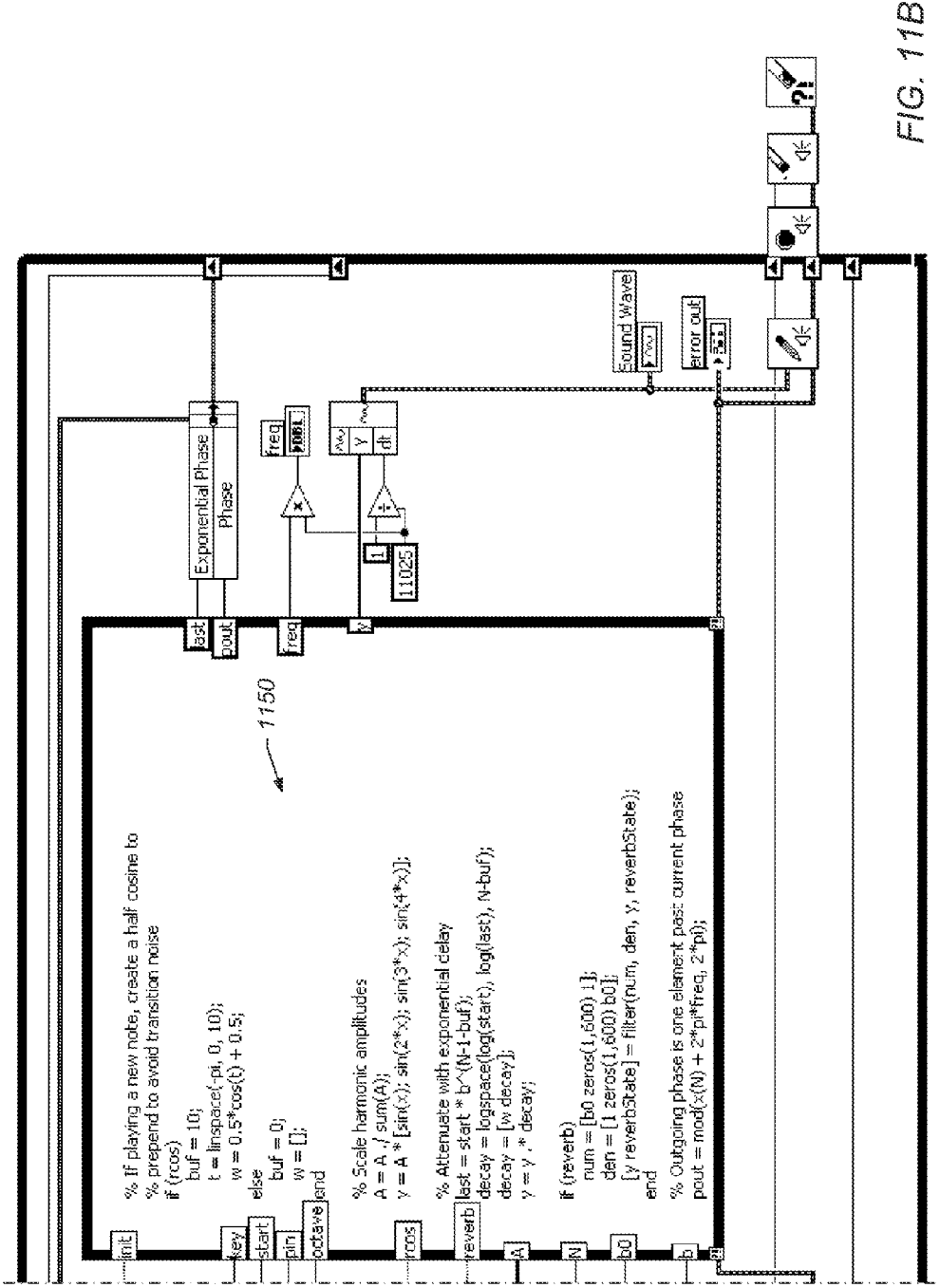
FIG. 11B illustrates a second portion of the exemplary graphical program that includes a second computational model, according to one embodiment.
Figure 12:
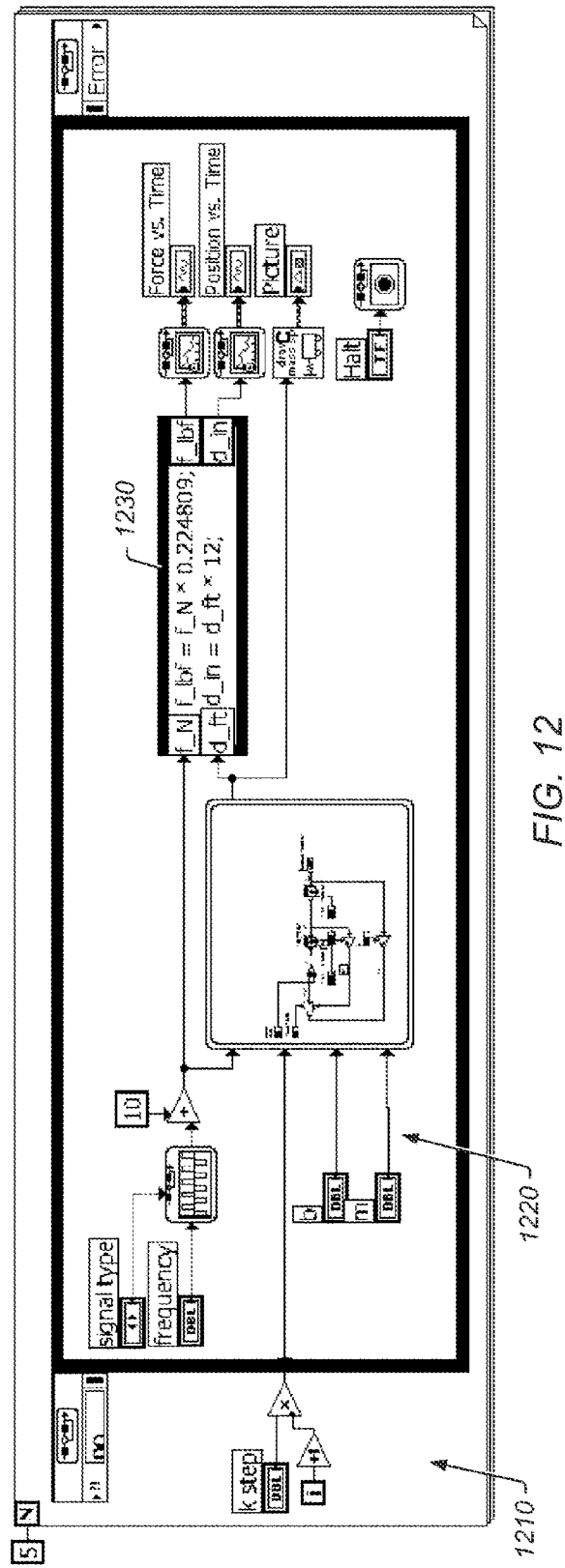
FIG. 12 illustrates an exemplary graphical program that includes three computational models, according to one embodiment.

FIGS. 11 (A and B) and 12 illustrate exemplary graphical programs with a plurality of computational models. As shown, the graphical program 1100 includes a first computational model 1130 (data flow) and a second computational model 1150 (text-based code). The graphical program 1100 implements an electronic keyboard with audio effects. There is also the option to turn the graphical program 1100 into a player piano so that it plays a song automatically. The graphical program 1100 (and more particularly, the first computational model 1130) includes virtual instruments (VIs) to control the sound output. Additionally, the graphical program 1100 includes an event structure which handles user interaction, e.g., clicking a key on the keyboard and/or the timing for automatically playing notes. The text-based node of the second computational model 1150 performs the sound using linear combinations of sinusoidal harmonics. Additionally, the second computational model includes text code which models a reverberation effect as well as a sustaining effect. Thus, the graphical program 1100 includes the first computational model 1130 and the second computational model 1150.

As also shown, the graphical program 1200 includes a first computational model 810 (data flow), a second computational model 1220 (continuous time simulation data flow), and a third computational model 1230 (text-based code). More specifically, the for loop and nodes outside 1220 represent data flow computation, the formula node 830 represents text-based computation, and the remaining portion (inside 1220) represents continuous time simulation data flow. Thus, the graphical program 1200 includes three computational models. Thus, FIGS. 11 (A and B) and 12 illustrate exemplary graphical programs with a plurality of computational models.

Figure 13:
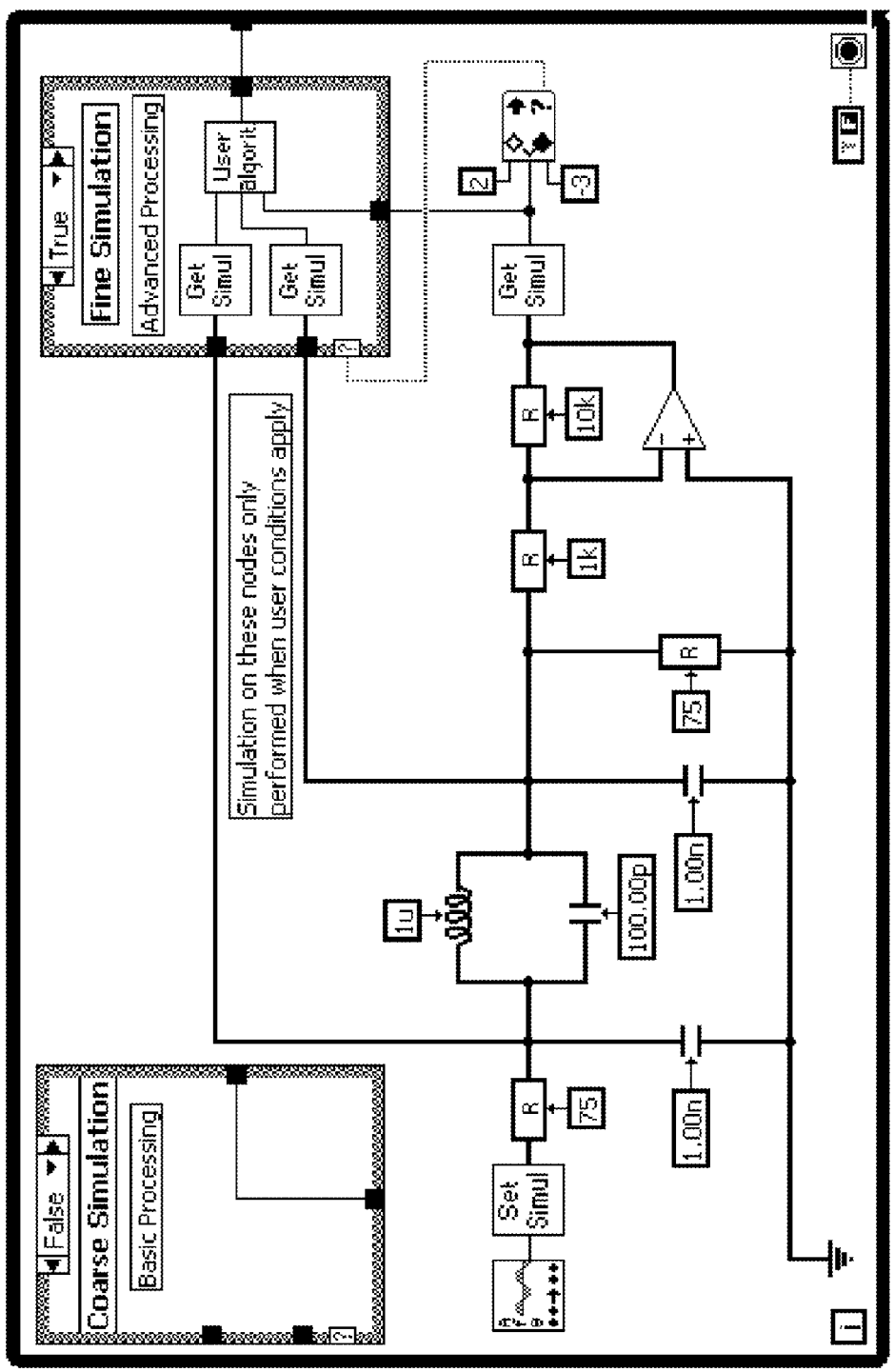
FIG. 13 illustrates a graphical program that includes a data flow diagram portion and a circuit diagram portion, according to one embodiment.

FIG. 13 illustrates a graphical program which includes a data flow diagram portion and a circuit diagram portion. Thus, the graphical program of FIG. 13 includes physical simulation (of a circuit) as well as graphical data flow.

Figure 14A:
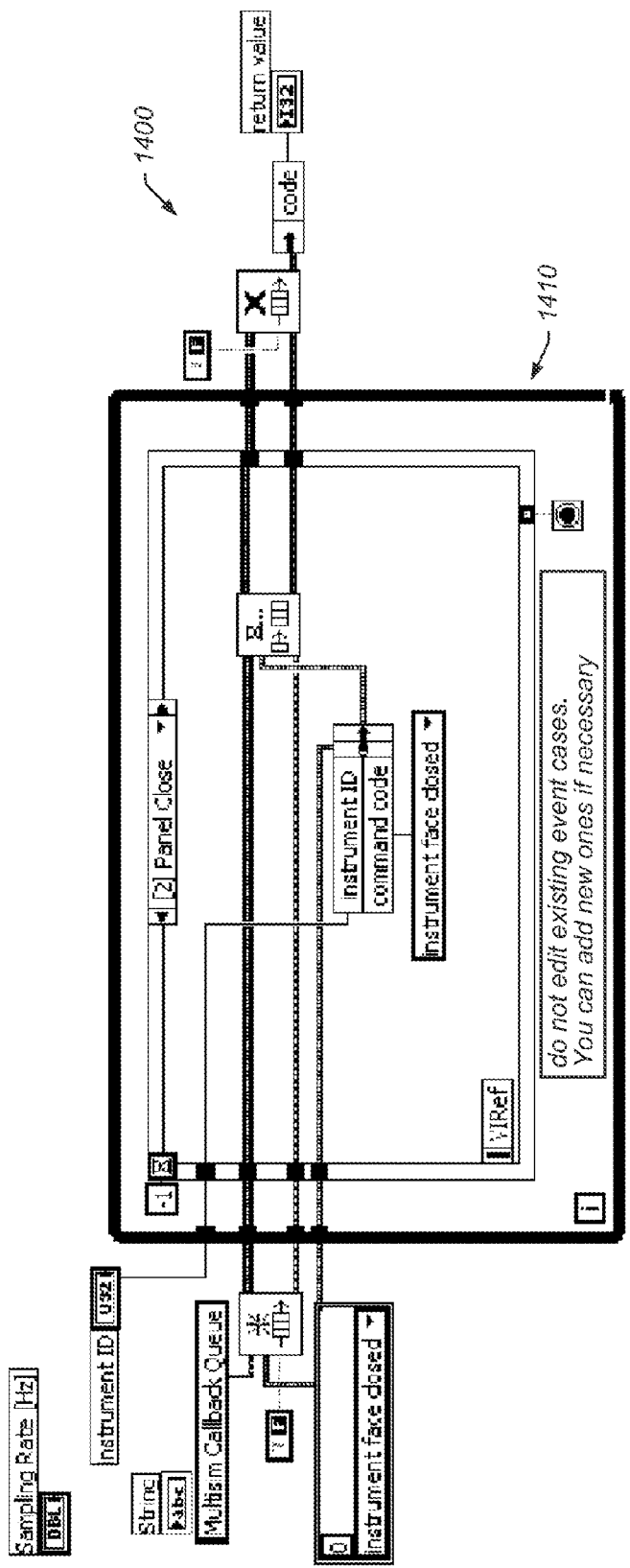
FIG. 14 illustrates an exemplary virtual instrument that includes a graphical program, according to one embodiment.
Figure 14B:
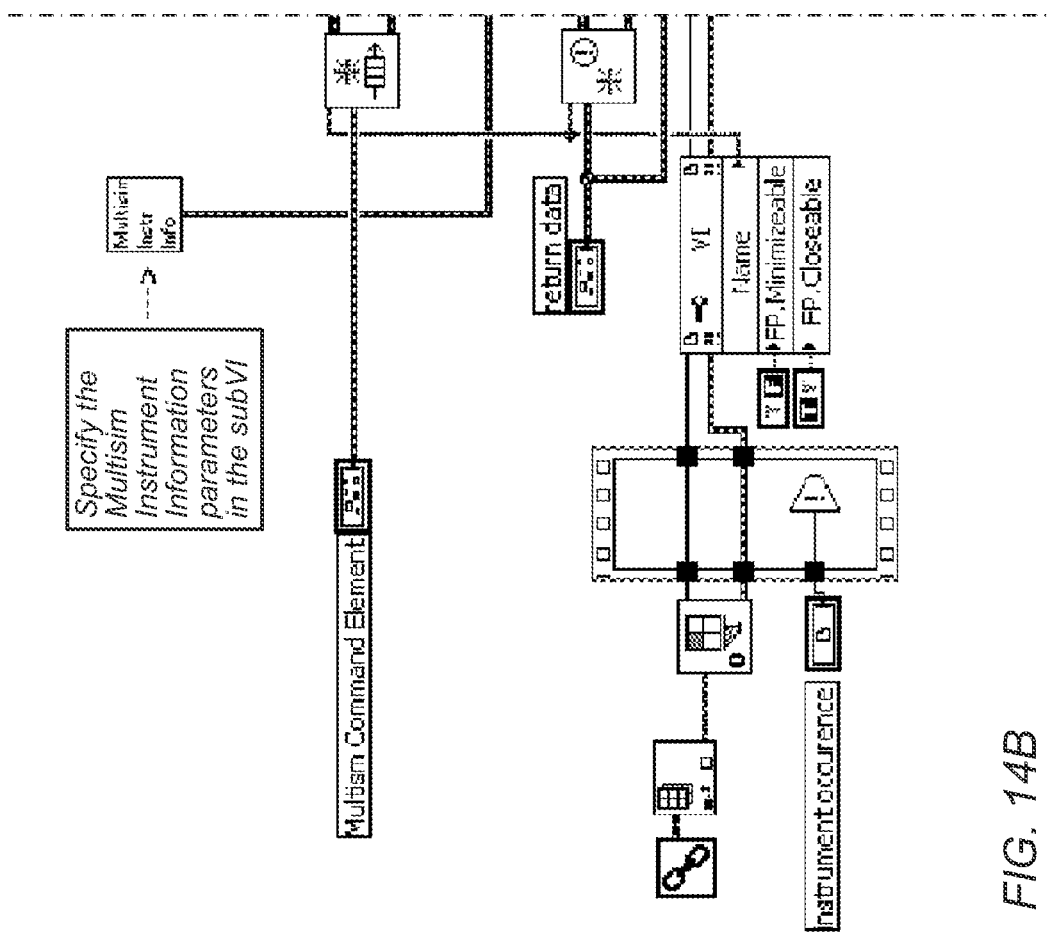
Figure 14C:
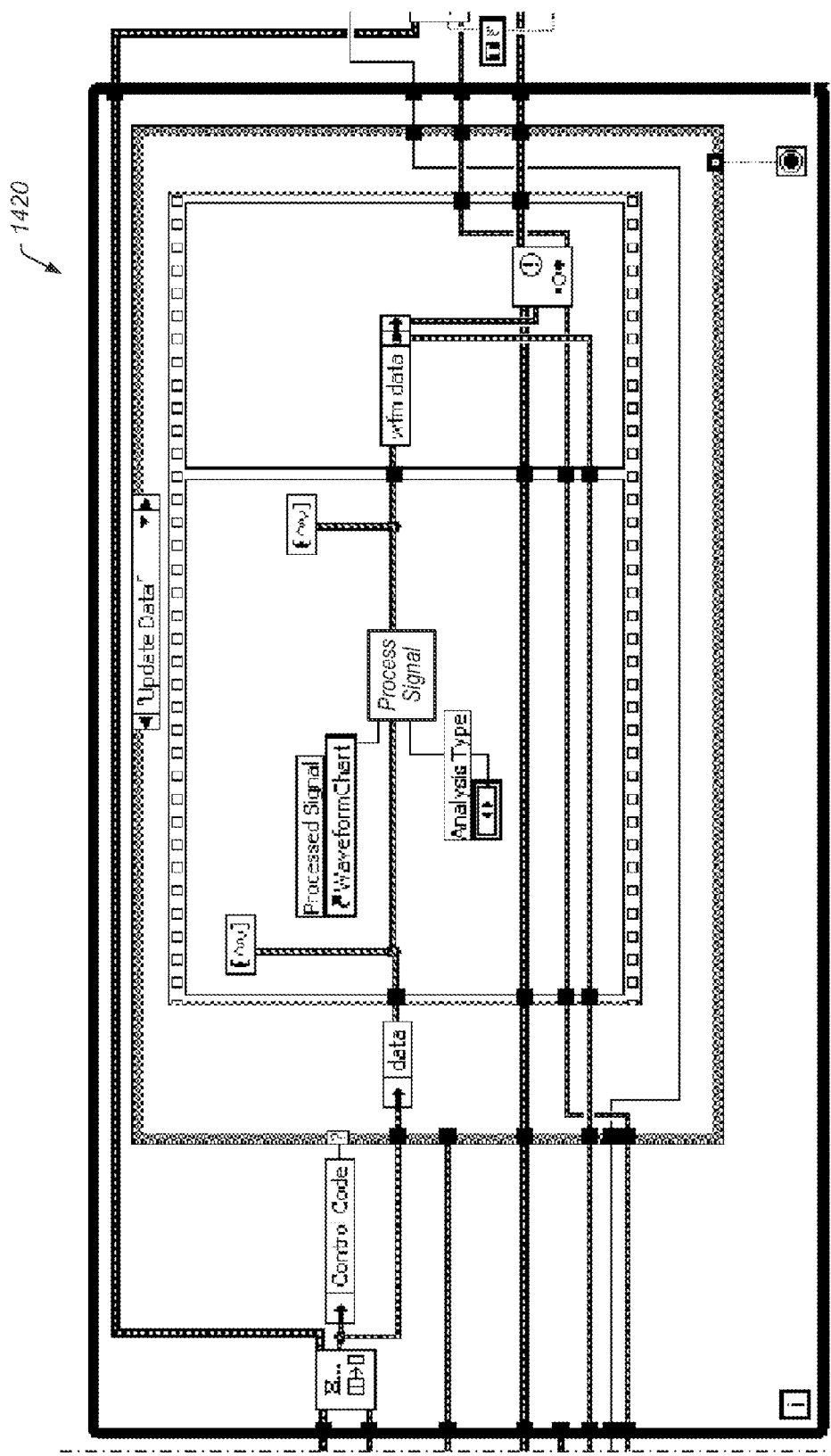
Figure 15:
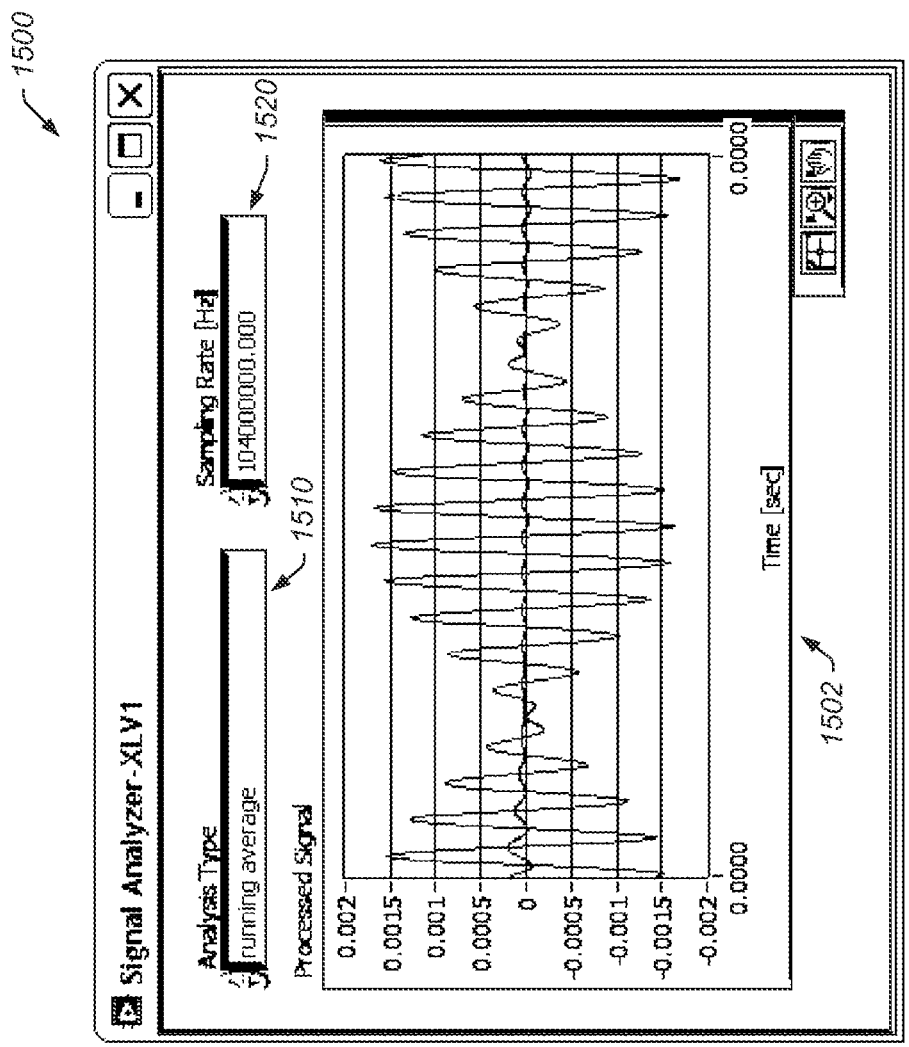
FIG. 15 illustrates an exemplary front panel for the exemplary virtual instrument of FIG. 14, according to one embodiment.
Figure 16:
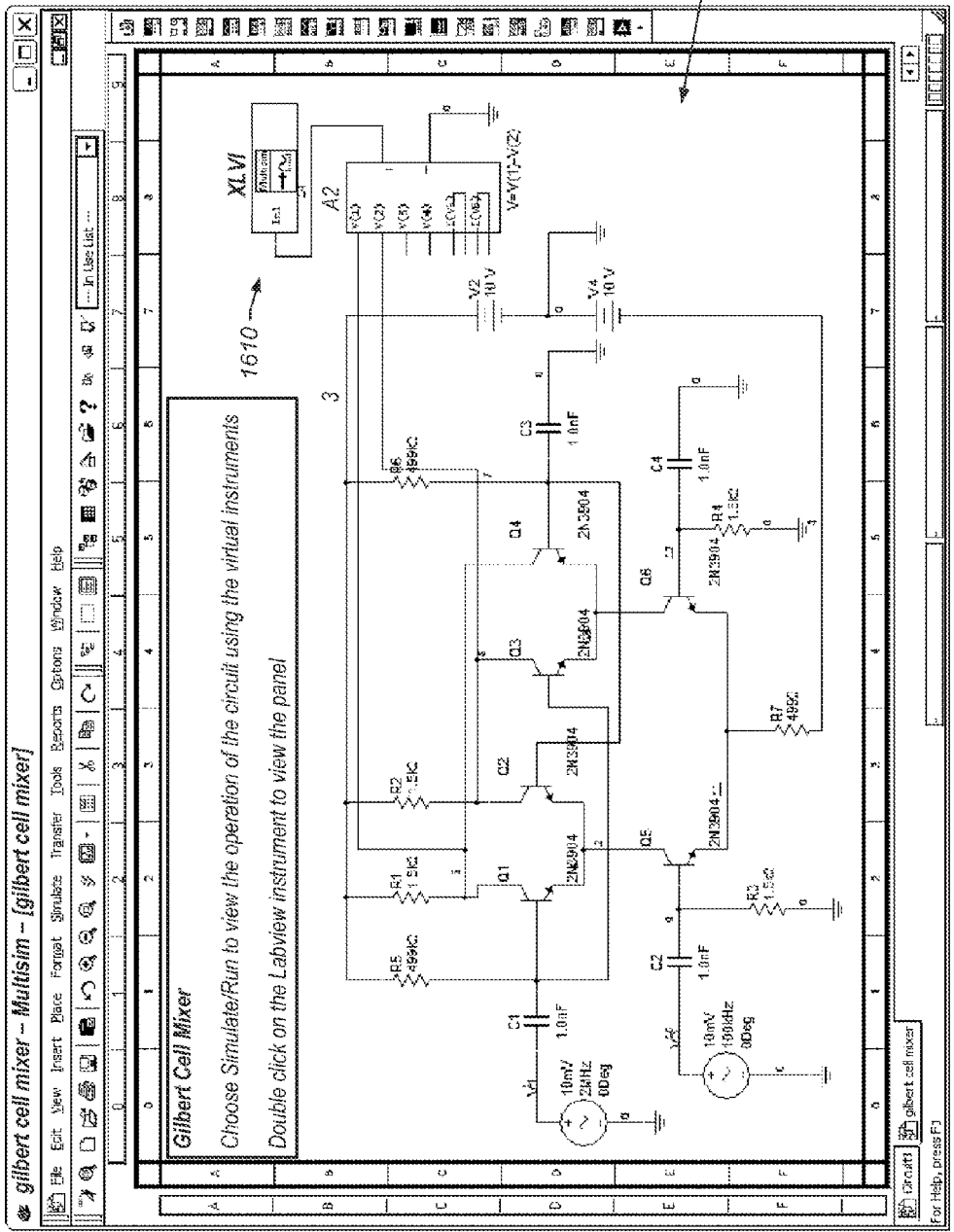
FIG. 16 illustrates an exemplary circuit diagram in a simulation environment, according to one embodiment.

FIGS. 14-16 illustrate an exemplary virtual instrument (with front panel) and simulated circuit following various embodiments described above. Note that this virtual instrument, front panel, and simulated circuit are not intended to limit the invention at all and are exemplary only. In other words, other virtual instruments, front panels, and simulated circuits are envisioned.

As shown, FIG. 14 illustrates an exemplary virtual instrument 1400 which includes a graphical program. More specifically, the virtual instrument 1400 is a signal analyzer which operates to analyze signals in an electronic circuit. The interconnected nodes shown in the Figure represent a portion of the graphical program. In other words, FIG. 14 illustrates a portion of the graphical source code, or block diagram, of the signal analyzer. This source code may implement both the functionality required to exchange data and status information with the simulation environment as well as the specific signal analysis function of the virtual instrument 1400 (e.g., the signal analyzer). As shown, graphical while loop 1410 and graphical while loop 1420 include the main structure of the virtual instrument 1400. The graphical while loop 1410 may implement a queue-based mechanism for communicating status information (e.g., panel open, panel close, etc.) between the simulation environment and the virtual instrument 1400 via an instrument interface DLL. The graphical while loop 1420 may implement a queue-based mechanism for exchanging simulation data between the simulation environment and the virtual instrument 1400 via an instrument interface DLL, as well as the signal analysis functionality of the virtual instrument 1400. Thus, FIG. 14 illustrates at least a portion of the virtual instrument 1400.

As shown, FIG. 15 illustrates an exemplary front panel 1500 for the virtual instrument 1400. In the front panel, the user may change the sampling rate, e.g., via the numeric control shown, and/or various other features of the virtual instrument using the controls on the front panel. As shown, the front panel 1500 may display (e.g., in window 1502) the time-domain analog voltage input signal, the auto-power spectrum of the input signal, or the running average of the input signal. Additionally, the user may interact with the graphical front panel by changing analysis type control 1510 and/or sampling rate control 1520. Before beginning simulation, the simulation environment may read the value in sampling rate control 1520 of a particular instance of the instrument via an instrument interface DLL. The simulation environment may use this information to determine the sampling rate to use when transforming the simulation data into evenly spaced time-value pairs to send to the particular instance of the instrument via an instrument interface DLL. Thus, FIG. 15 illustrates an exemplary front panel of the virtual instrument 1400.

As shown, FIG. 16 illustrates an exemplary circuit diagram 1600 in the simulation environment. Additionally, as shown, the virtual instrument 1400 may be represented by a virtual instrument icon 1610. The virtual instrument icon allows the user to connect the circuit to the virtual instrument 1400 (e.g., specific inputs and/or outputs of the virtual instrument 1400). Thus, during execution, the virtual instrument 1400 may receive voltage simulation data from the simulated circuit 1600, e.g., according to the interconnections illustrated in the circuit diagram 1600.

Thus, the circuit diagram 1600 represents a graphical program with multiple models of computation (graphical data flow from the virtual instrument 1400 and physical simulation of circuits from the circuit diagram). The graphical program, including the circuit diagram 1600 and virtual instrument 1400, is executable to perform the functionality described by the nodes and connections of the graphical program, that is, signal analysis and circuit simulation. The graphical program is deployable onto a programmable hardware element as described herein. Thus, FIG. 16 illustrates the exemplary circuit diagram 1600 including the virtual instrument icon 1610 which represents the virtual instrument 1400. Thus, FIGS. 14-16 are specific examples of a virtual instrument, front panel, and simulated circuit coupled to the virtual instrument.

Figure 17:
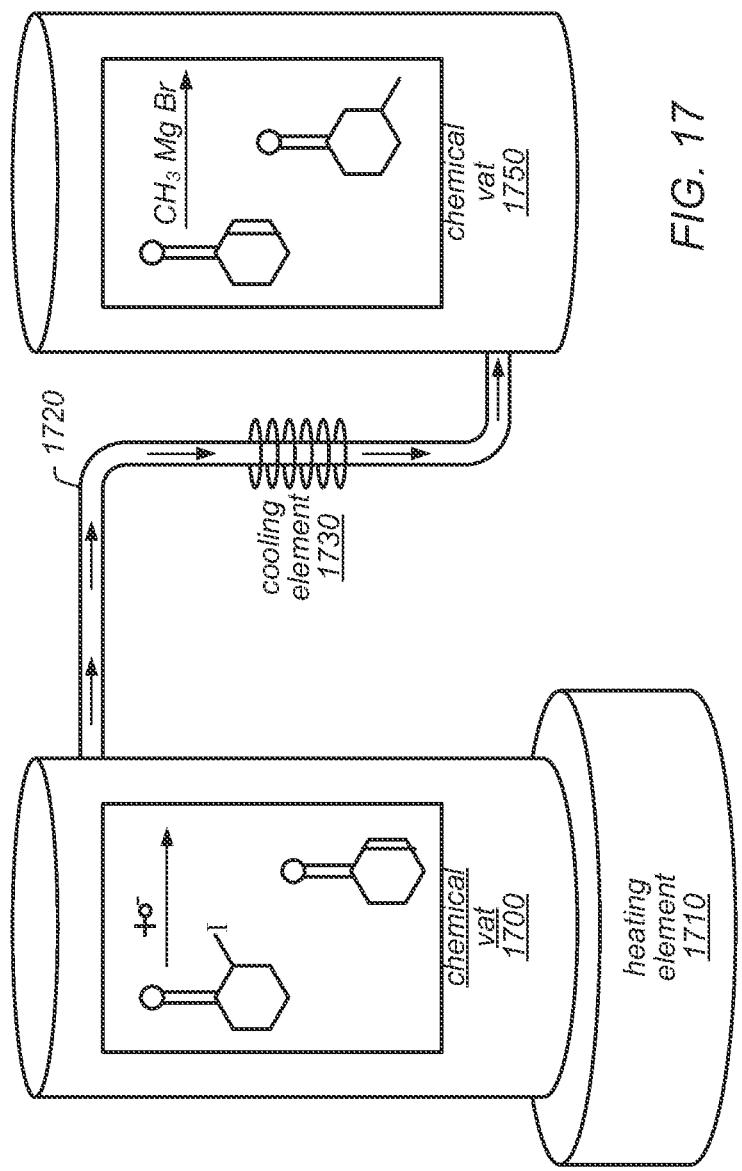
FIG. 17 illustrates an exemplary graphical program that includes three different physical modeling domains, according to one embodiment.

FIG. 17 illustrates a graphical program which includes three different physical modeling domains. First, chemical vat 1700 illustrates a chemical reaction occurring in a large vat where Iodine is eliminated from 2-iodocyclohexanone to form 2-cyclohexenone using tert-butoxide. This reaction is heated by heating element 1710. The product is then removed via pipe 1720 and cooled by cooling element 1720 before proceeding to the next chemical vat 1750 where the resulting 2-cyclohexenone product is reacted with a methyl Grignard reagent to form 3-methylcyclohexanone. In this particular graphical program, the two reactions are simulated using chemical domain simulation, the movement of product from vat 1700 to vat 1750 is simulated using hydrodynamic simulation, and the heating and cooling elements are also simulated using thermodynamic/physical modeling simulation.

Figure 18:
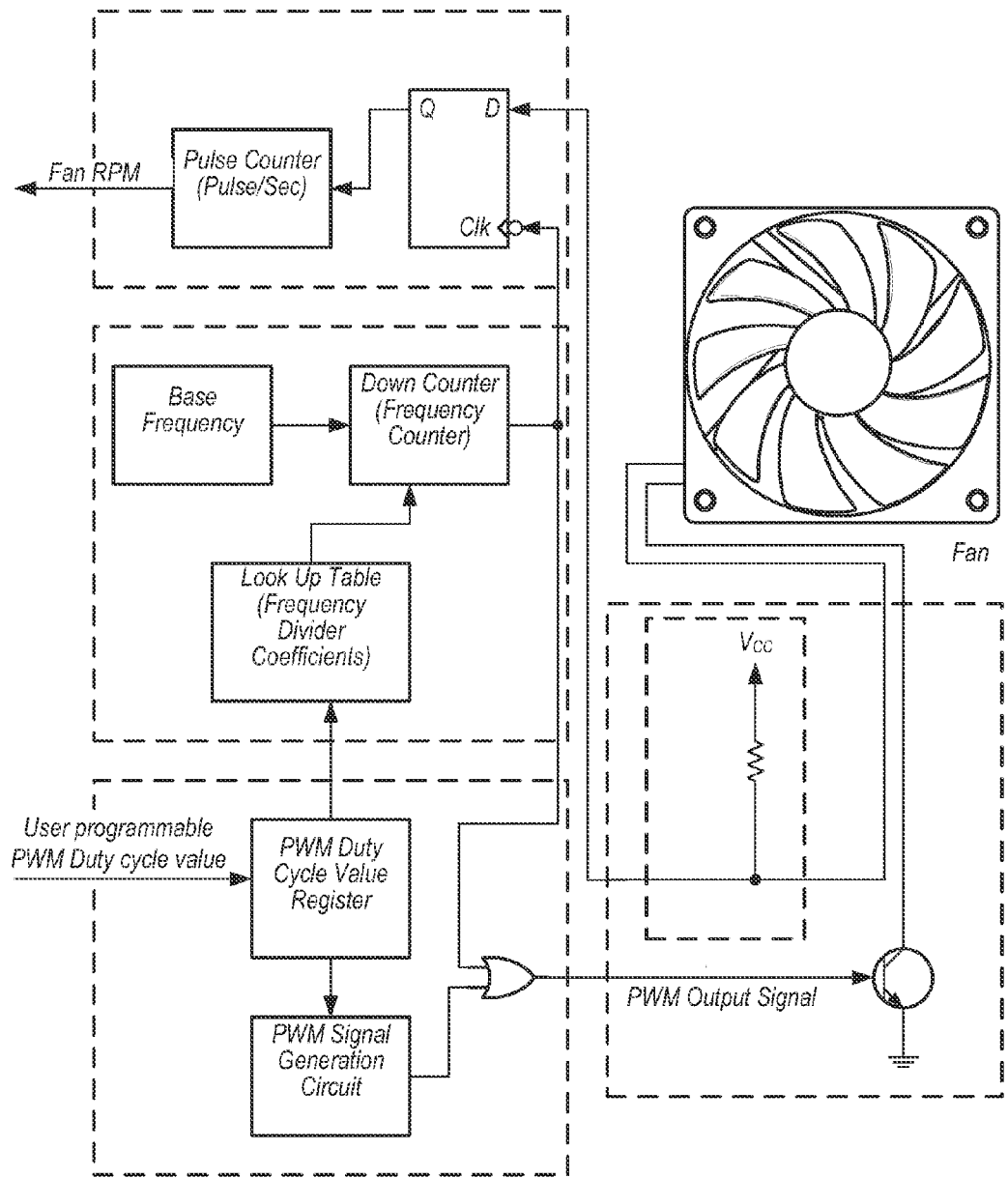
FIG. 18 illustrates an exemplary graphical program in which an electronic diagram is simulated to control a physical fan, according to one embodiment.

FIG. 18 illustrates a graphical program in which an electronic diagram is simulated to control a physical fan. Thus, in this figure two different physical domains are simulated, the electronic and physical domains.

Figure 19:
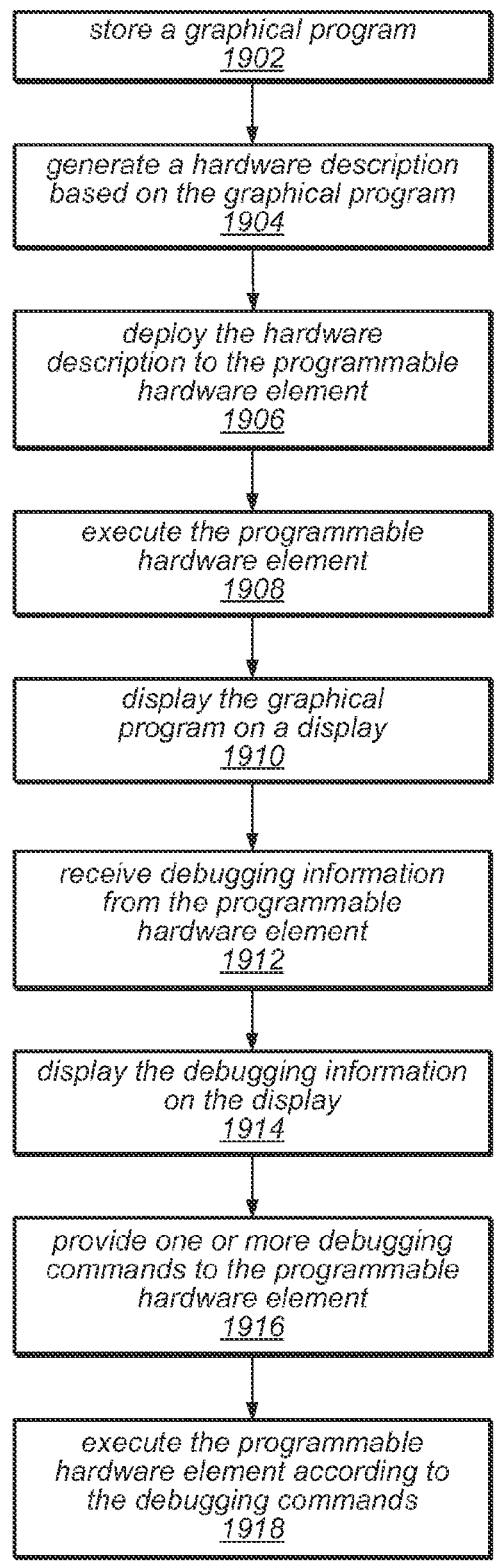
FIG. 19 is a flowchart diagram illustrating one embodiment of a method for debugging an executable diagram that is executing on a programmable hardware element.

FIG. 19—Debugging a Graphical Program Executing on a Programmable Hardware Element FIG. 19 illustrates one embodiment of a method for debugging a graphical program executing on a programmable hardware element. The method shown in FIG. 17 may be used in conjunction with any of the methods, computer systems, or devices described herein. In various embodiments, some of the step shown may be performed concurrently, in a different order than shown, or may be omitted. Additional steps may also be performed as desired. As shown, this method may operate as follows.

In 1902, a graphical program may be received (e.g., over a network) and/or stored on a memory medium. The graphical program may also be provided for display on a display of a computer system. Similar to descriptions above, the graphical program may have been assembled manually or automatically, as desired. Additionally, the graphical program may include a plurality of models of computation and/or a plurality of physical simulation domains, as described above. However, the graphical program may only include a single model of computation, as desired. The graphical program may include a plurality of interconnected nodes which visually indicates the functionality of the graphical program.

In 1904, a hardware description may be generated based on the graphical program. The hardware description may be created in the manner described above, among other possibilities. However, it should be noted that the hardware description may be generated in a manner as to allow for debugging of the graphical program as it executes on the programmable hardware element (e.g., as opposed to simulation of execution of the graphical program on the programmable hardware element). For example, the hardware description may provision registers or pathways of communication on the programmable hardware element for providing debugging information to a host computer coupled to the programmable hardware element, as described below. The debugging information may be any of various types of information. For example, the debugging information may indicate a state of execution or portion of the graphical program that is being executed, the value of various variables, etc. Additionally, the programmable hardware element may be configured by the hardware description to receive and respond to debugging commands, e.g., such as stop commands, watch commands, step through commands, etc. Thus, the hardware description may allow the programmable hardware element to be debugged in the manner described below.

In various embodiments, the hardware description may describe or may be usable to configure the programmable hardware element to perform a specific, pre-configured debugging operation. For example, the hardware description may specify that specific variables may be watched or that specific information may be provided as debugging information during execution. However, once configured, the debugging information may not be modified without regenerating a hardware description (as in 1704) and reconfiguring the programmable hardware element (as in 1706 below). Thus, the hardware description may be used for a preconfigured or predetermined debugging operation and may not be able to perform dynamic debugging operations which may be specified after configuration in 1906 below.

Alternatively, the debugging configuration specified by the hardware description may be generalized such that it can perform all (or at least a subset of) debugging operations that the user or software may wish to perform after configuring the programmable hardware element in 1906. Thus, the hardware description may include specific or generalized debugging configuration information for the programmable hardware element.

In 1906, a programmable hardware element may be configured according to the hardware description. More specifically, the hardware description may be deployed to the programmable hardware element such that the programmable hardware element is configured to implement the functionality specified by the hardware description (and correspondingly, the graphical programs) upon execution. In some embodiments, the programmable hardware element may be included in various devices, such as real time devices, as indicated above. Thus, 1706 may include configuring a device which includes the programmable hardware element.

In 1908, the programmable hardware element may be executed to perform the functionality specified by the graphical programs. As indicated above, the programmable hardware element may be configured (e.g., may have configured portions which are configured) to allow for debugging of the graphical program executing on the programmable hardware element.

In 1910, the graphical program may be provided for display on a display of the host computer coupled to the programmable hardware element. In some embodiments, the hardware description (e.g., a netlist or VHDL code) may also be provided for display on the display. For example, the graphical program and the corresponding hardware description may both be provided for display by the computer system, e.g., such that a user may review both the graphical program and hardware description during execution of the graphical program by the programmable hardware element. The graphical program and hardware description may be provided for display on the same display, on different displays, and/or on different computer systems, as desired.

Additionally, it should be noted that that host computer may also execute a portion of the graphical program executing on the programmable hardware element. Thus, the graphical program may be executed in a distributed fashion between the programmable hardware element and the host computer system. However, in alternate embodiments, the host computer system may only provide a user interface for the user for debugging the graphical program executing on the programmable hardware element and may not assist in any actual execution of the graphical program. In other words, the host computer may only be used for providing debugging commands to the programmable hardware element or viewing debugging information provided by the programmable hardware element.

In 1912, during execution of the graphical program by the programmable hardware element, the computer system may receive debugging information from the programmable hardware element. As indicated above, the debugging information may be any of various types of information usable for debugging the graphical program.

In 1914, the debugging information may be provided for display on the display of the host computer system. For example, the debugging information may be displayed in the graphical program (and/or hardware description) which is displayed by the host computer system.

For example, as indicated above, the debugging information may indicate the current portion or node that is being executed in the graphical program. Accordingly, the debugging information may indicate that portion of the graphical program on the display. For example, the portion of the graphical program that is currently executing on the programmable hardware element may be highlighted or otherwise indicated in the graphical program which is displayed on the display of the graphical program. Additionally, or alternatively, the portion of the hardware description may be indicated on the display. For example, both the hardware description and the graphical program may be displayed on the display, and the debugging information may indicate (or may otherwise be inferred from the debugging information) which portion of the hardware description and/or graphical program is currently executing, and that portion may be highlighted or displayed in the graphical program and/or hardware description. The debugging information may also indicate current values in the graphical program.

Figure 20:
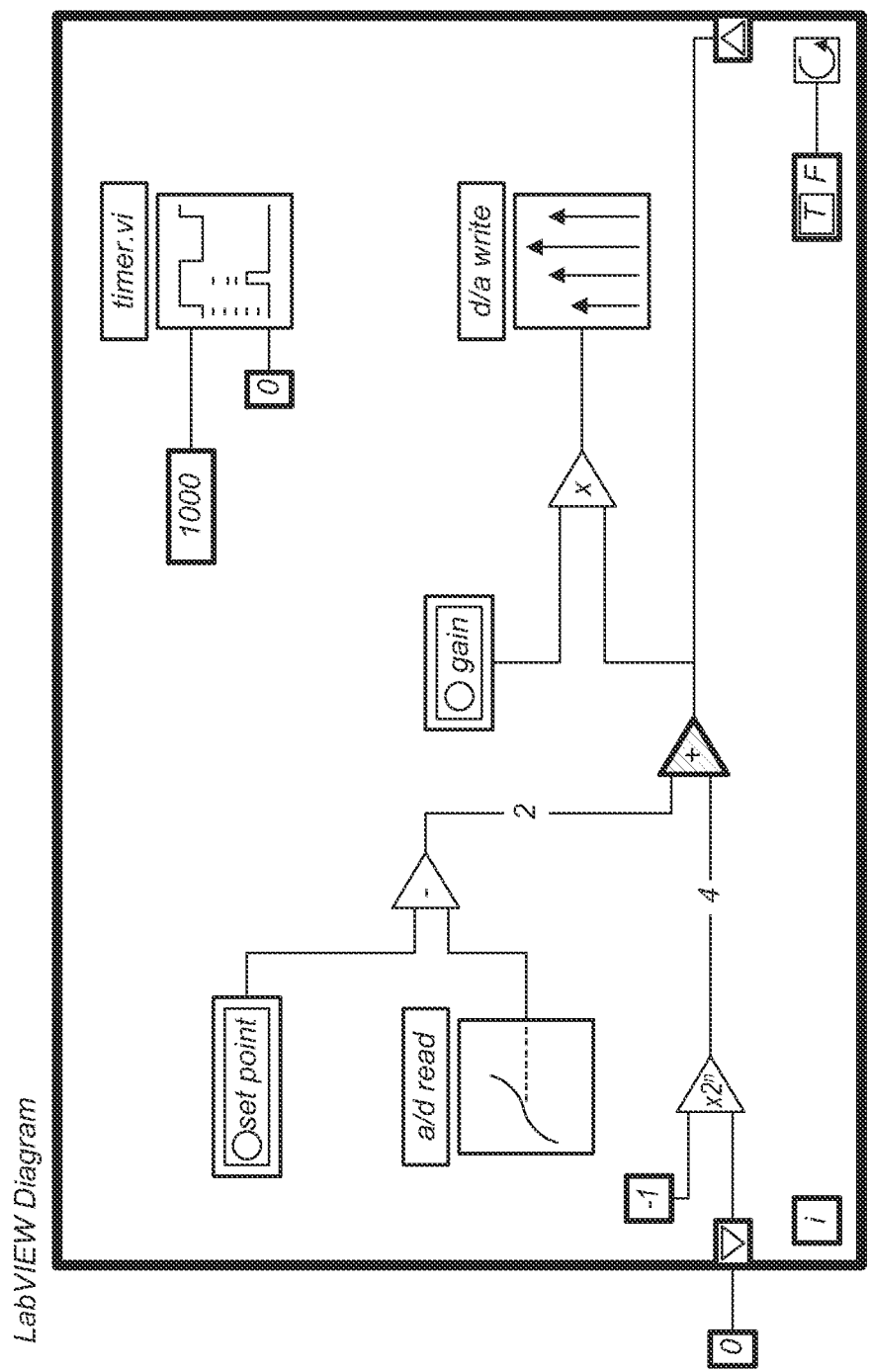
FIG. 20 is an exemplary screen shot corresponding to the method of FIG. 19, where a currently executing add node in a graphical program is indicated on a display, according to one embodiment.

FIGS. 20 and 21 illustrate exemplary screenshots where a current executing portion of both a graphical program and a hardware description is indicated on the display. As shown in FIG. 20, in the graphical program, the add node of the graphical program is indicated (the add node is shaded in FIG. 20) as currently executing via highlighting. Additionally, values of the incoming values to the add node are also shown, in this case 2 from the previous subtract node and 4 from the previous exponent node. Thus, during execution, debugging information (e.g., which indicates current execution information, values, and/or other information) may be displayed in the graphical program on the display. Additionally, or alternatively, the debugging information may be displayed in the hardware description. As shown in FIG. 21, the current portion of the hardware description (in this case, written in VHDL) may be highlighted and displayed on the display.

In 1916, one or more debugging commands may be provided (e.g., by the host computer) to the programmable hardware element. Correspondingly, in 1718, the programmable hardware element may execute according to the debugging commands provided in 1916. For example, the debugging commands may include a stop command, which may request that the programmable hardware element stop executing, or at least operate in a manner which makes it appear that the programmable hardware element has stopped executing. For example, in one embodiment, the programmable hardware element may actually stop executing in response to the stop command. In one embodiment, the programmable hardware element may store current state information or otherwise provide or store information which may allow the programmable hardware element to restart execution at the same point that it ceased execution.

Alternatively, the programmable hardware element may make it appear that the programmable hardware element has stopped executing, but may actually continue to execute. For example, the programmable hardware element may store various information in registers or files (e.g., locally or remotely) such that it may respond to debugging commands as if it had stopped executing, when it fact it is continuing to execute. Thus, any information that may later be requested or otherwise required may be stored or queued in advance while the programmable hardware element continues to execute, despite the fact that this information may not be provided immediately (since it was requested to have stopped executing). Thus, in response to the stop command, the programmable hardware element may act as though it has stopped executing and then subsequently respond to future debugging commands as if it had stopped executing even though it does not, according to one embodiment.

After providing a stop command, if the user provides input to resume execution, the programmable hardware element may provide the stored state information which may allow the programmable hardware element to simulate restart of execution at the same point that it ceased execution. As an alternative, when the user provides input to resume execution, the programmable hardware element may begin execution anew (from the beginning) but may only provide output starting from the previous stop point, again to simulate restart of execution at the same point that it ceased execution.

Additionally, the debugging commands may include a step-through command, which may request that the programmable hardware element execute portions or nodes one at a time. Thus, from a stopped state, the programmable hardware element may execute a next step, node, or portion of the graphical program (e.g., in response to user input, possibly selecting "next" in a step sequence) and then may stop again at that point. Similar to the stop command above, the programmable hardware element may be able to actually perform step-through commands or may, alternatively, continue to execute but store data in a manner that allows it to respond as though it is stepping through execution. In either case, the user may watch execution of the graphical program and provide input for each execution step of the graphical program. As another alternative, as mentioned above, the programmable hardware element may begin execution anew (from the beginning) at each step through command, but may only provide output starting from the previous stop point, again to simulate restart of execution at the same point that it ceased execution in the prior step through.

The debugging commands may also include a resume command, which may cause the programmable hardware element to resume execution from its current state (e.g., from a previous stop or step through command). In some embodiments, the programmable hardware element may have actually stopped executing and may resume execution at the previous stopped state. This may be achieved by reloading state information from the stop time and restarting execution or otherwise restarting execution from where it stopped. As noted above, the resume command may be implemented by the programmable hardware element may begin execution anew (from the beginning), but only providing output from the stop point.

Alternatively, where it continued to run from the previous stopped state, the programmable hardware element may execute and provide debugging information as if it were restarted at the later time even though it has continued to run, e.g., by using information that was stored while it was "stopped" and continued to run. As another possibility, the programmable element may "catch up" to its own execution state and corresponding appear to execute in a manner faster than it normally operates (e.g., since it may have been executing during the time it was "stopped"). However, such behavior may not always be desirable and may be configurable or removed, according to various embodiments.

The debugging commands may further include a watch command, which may be used to "watch" the value(s) of a particular variable or data structure of the graphical program. In response to such a command, the programmable hardware element may provide data that provides the value(s) of that particular variable or data structure. Such data may not have been provided before receiving the watch command. Thus, as demonstrated by the watch command example, further debugging information may be received from the programmable hardware element in response to the debugging commands.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer-accessible memory medium storing program instructions executable by a computer system to:
   display a graphical program, wherein the graphical program comprises a first plurality of nodes, wherein the first plurality of nodes are interconnected by a first plurality of lines visually indicating a first model of computation, and wherein the graphical program further comprises a second plurality of nodes, wherein the second plurality of nodes are interconnected by a second plurality of lines visually indicating a second model of computation that is different than the first model of computation; and
   generate a hardware description based on the graphical program, wherein the hardware description describes a hardware implementation of the graphical program, and wherein the hardware description is configured to configure a programmable hardware element to implement functionality of the graphical program.

2. The non-transitory computer-accessible memory medium of claim 1,
   wherein the first model of computation comprises a data flow model of computation; and
   wherein the second model of computation comprises a simulation model of computation.

3. The non-transitory computer-accessible memory medium of claim 1,
   wherein the first model of computation comprises a data flow model of computation; and
   wherein the second model of computation comprises a state diagram model of computation.

4. The non-transitory computer-accessible memory medium of claim 1,
   wherein the first model of computation comprises a first data flow model of computation that operates according to first data flow semantics; and
   wherein the second model of computation comprises a second data flow model of computation that operates according to second data flow semantics.

5. The non-transitory computer-accessible memory medium of claim 1,
   wherein the first model of computation comprises a data flow model of computation; and
   wherein the second model of computation comprises a synchronous reactive model of computation.

6. The non-transitory computer-accessible memory medium of claim 1,
   wherein the hardware description includes a first portion corresponding to the first model of computation and a second portion corresponding to the second model of computation;
   wherein the hardware description specifies communication between the first portion and the second portion.

7. The non-transitory computer-accessible memory medium of claim 1, wherein the program instructions are further executable by the computer system to configure the programmable hardware element using the hardware description, wherein said configuring configures the programmable hardware element to perform functionality of the graphical program.

8. The non-transitory computer-accessible memory medium of claim 1, wherein said displaying the graphical program comprises displaying the first plurality of nodes and the second plurality of nodes in a same graphical interface.

9. The non-transitory computer-accessible memory medium of claim 1, wherein the programmable hardware element is comprised in a real time target device.

10. A method comprising:
    a computer system displaying a graphical program, wherein the graphical program comprises a first plurality of nodes, wherein the first plurality of nodes are interconnected by a first plurality of lines visually indicating a first model of computation, and wherein the graphical program further comprises a second plurality of nodes, wherein the second plurality of nodes are interconnected by a second plurality of lines visually indicating a second model of computation that is different than the first model of computation; and
    the computer system generating a hardware description based on the graphical program, wherein the hardware description describes a hardware implementation of the graphical program, and wherein the hardware description is configured to configure a programmable hardware element to implement functionality of the graphical program.

11. The method of claim 10,
    wherein the first model of computation comprises a data flow model of computation; and
    wherein the second model of computation comprises a simulation model of computation.

12. The method of claim 10,
    wherein the first model of computation comprises a data flow model of computation; and
    wherein the second model of computation comprises a state diagram model of computation.

13. The method of claim 10,
    wherein the first model of computation comprises a first data flow model of computation that operates according to first data flow semantics; and
    wherein the second model of computation comprises a second data flow model of computation that operates according to second data flow semantics.

14. The method of claim 10,
    wherein the first model of computation comprises a data flow model of computation; and wherein the second model of computation comprises a synchronous reactive model of computation.

15. A system comprising:
a display device;
a processor; and
a memory medium storing program instructions, wherein the program instructions are executable by the processor to:
display a graphical program on the display device, wherein the graphical program comprises a first plurality of nodes, wherein the first plurality of nodes are interconnected by a first plurality of lines visually indicating a first model of computation, and wherein the graphical program further comprises a second plurality of nodes, wherein the second plurality of nodes are interconnected by a second plurality of lines visually indicating a second model of computation that is different than the first model of computation; and
generate a hardware description based on the graphical program, wherein the hardware description describes a hardware implementation of the graphical program, and wherein the hardware description is configured to configure a programmable hardware element to implement functionality of the graphical program.

16. The system of claim 15,
wherein the first model of computation comprises a data flow model of computation; and
wherein the second model of computation comprises a simulation model of computation.

17. The system of claim 15,
wherein the first model of computation comprises a data flow model of computation; and
wherein the second model of computation comprises a state diagram model of computation.

18. The system of claim 15,
wherein the first model of computation comprises a first data flow model of computation that operates according to first data flow semantics; and
wherein the second model of computation comprises a second data flow model of computation that operates according to second data flow semantics.

19. The system of claim 15,
wherein the first model of computation comprises a data flow model of computation; and
wherein the second model of computation comprises a synchronous reactive model of computation.

* * * * *